Aug. 15, 1944.  O. MUELLER ET AL  2,355,997
FRAME RIVETING MACHINE
Filed Nov. 28, 1939  29 Sheets-Sheet 3
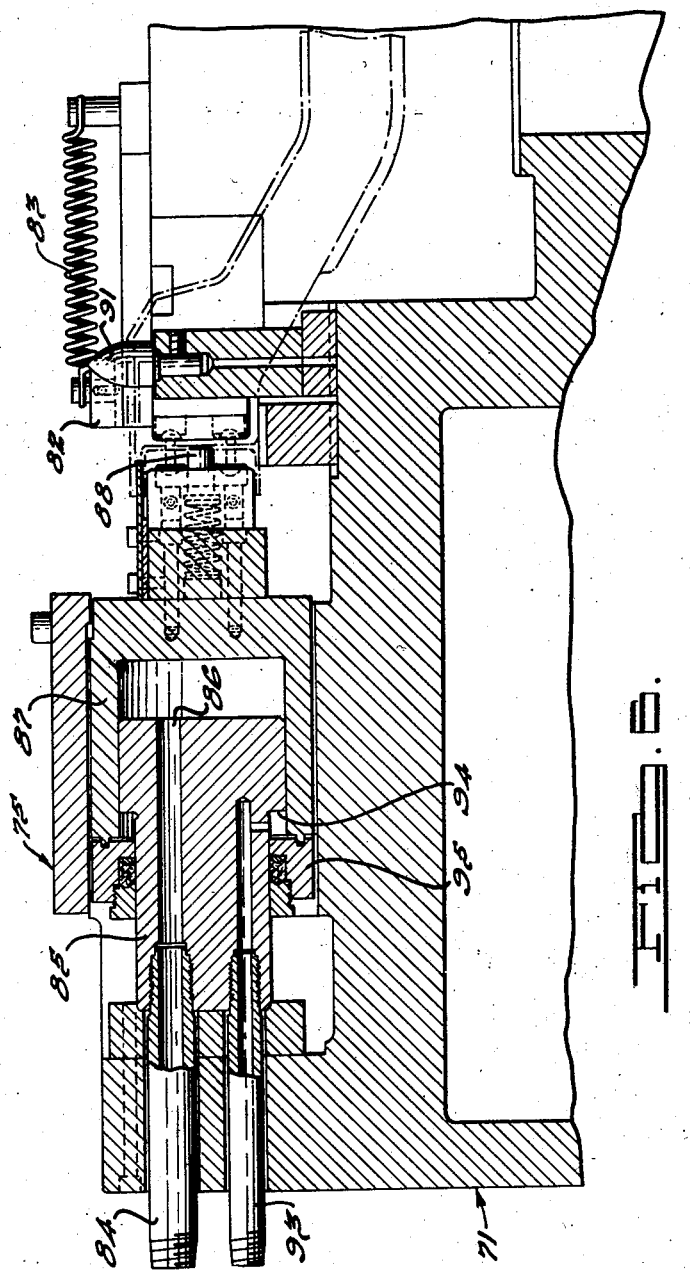
INVENTORS.
Otto Mueller,
BY Harry G. Scholtz.
Harness, Dickey & Pierce.
ATTORNEYS

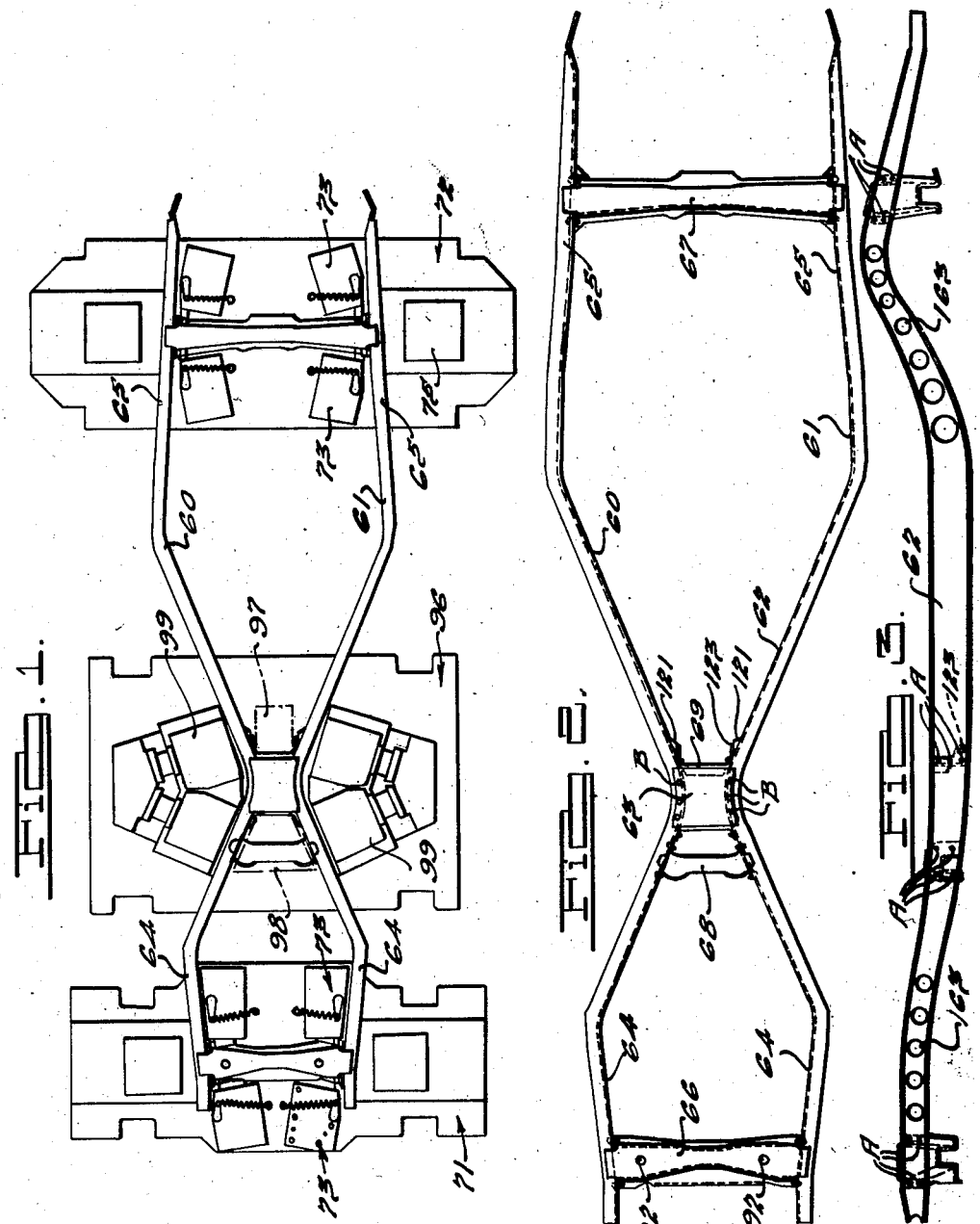

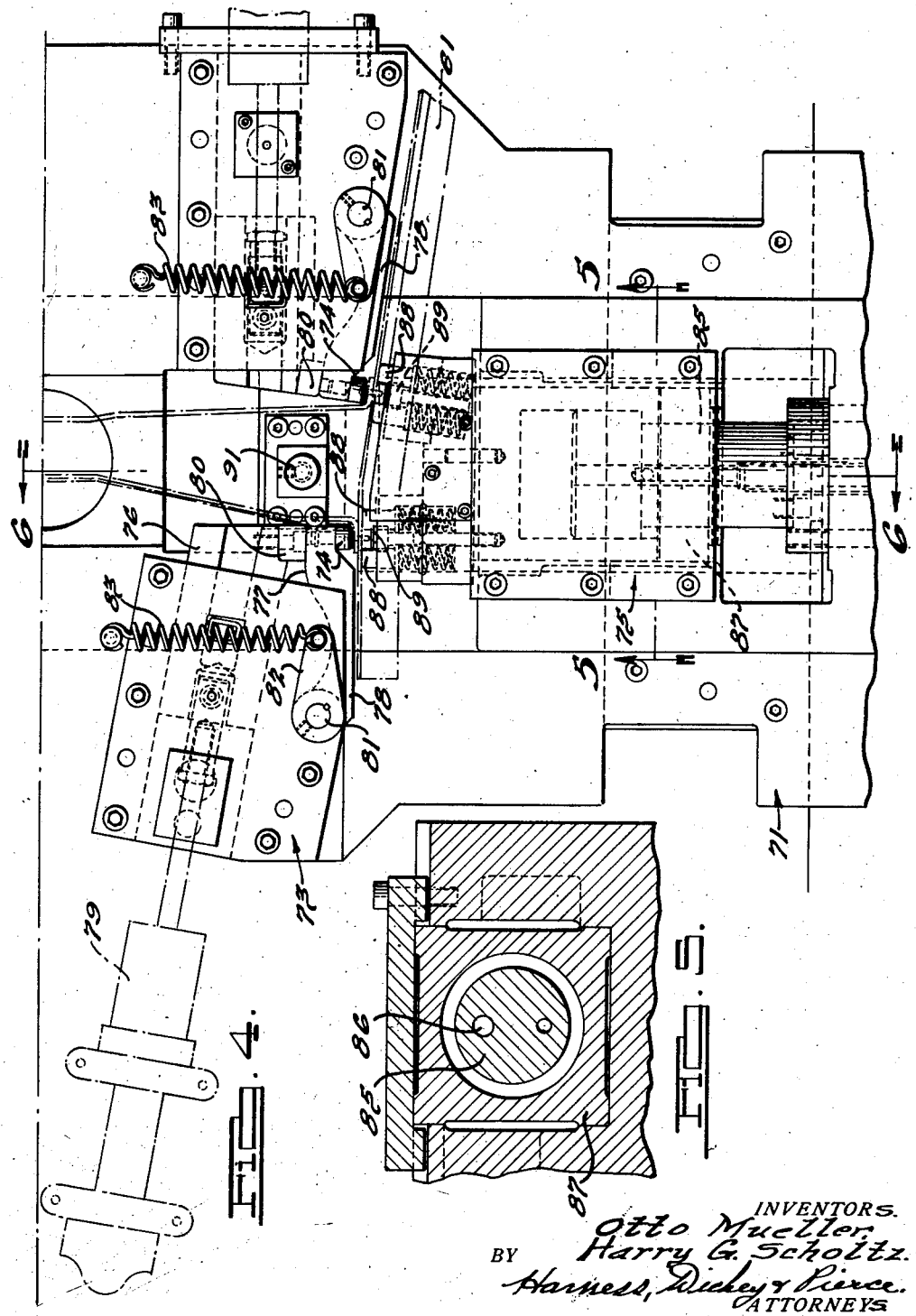

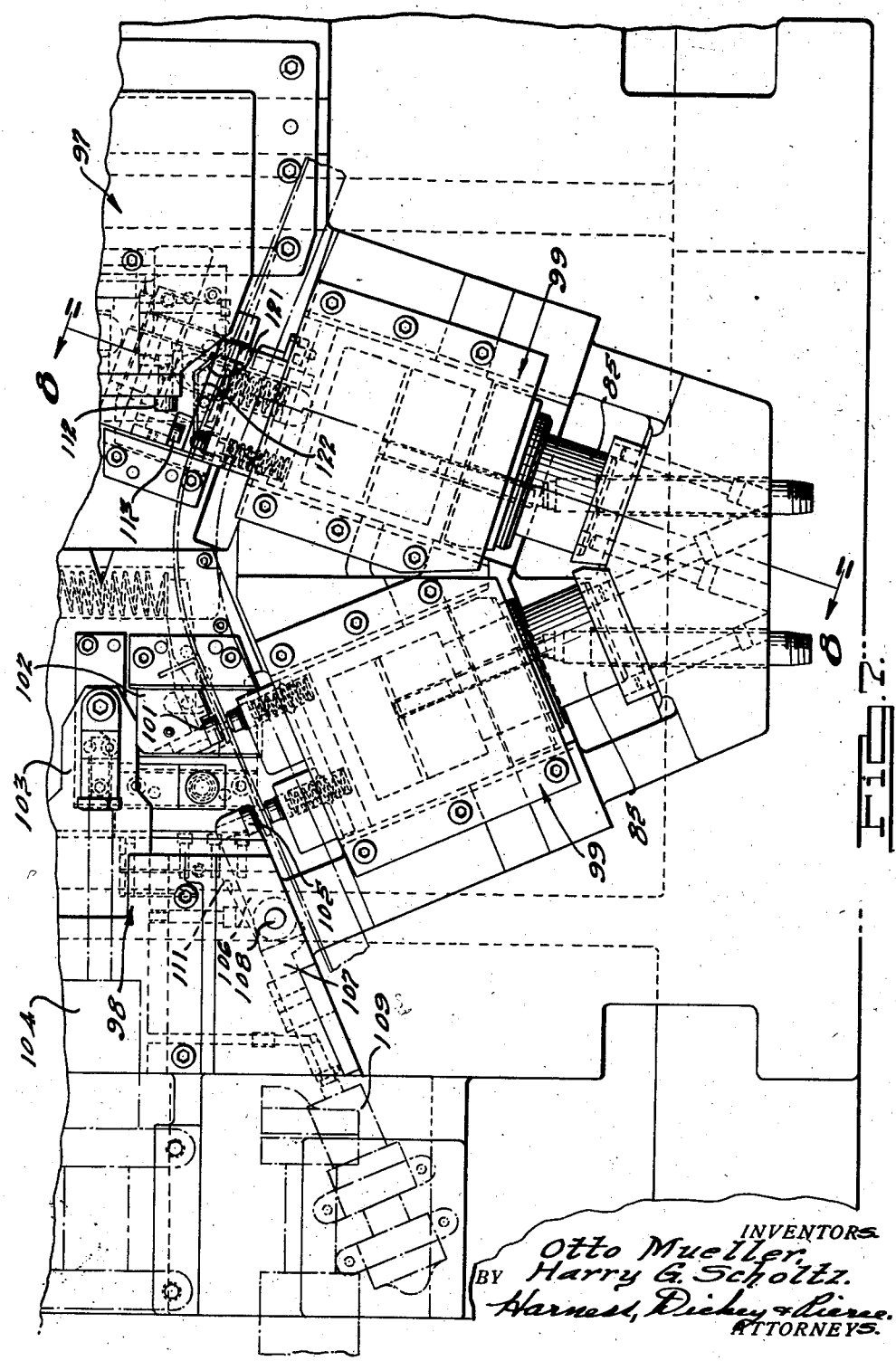

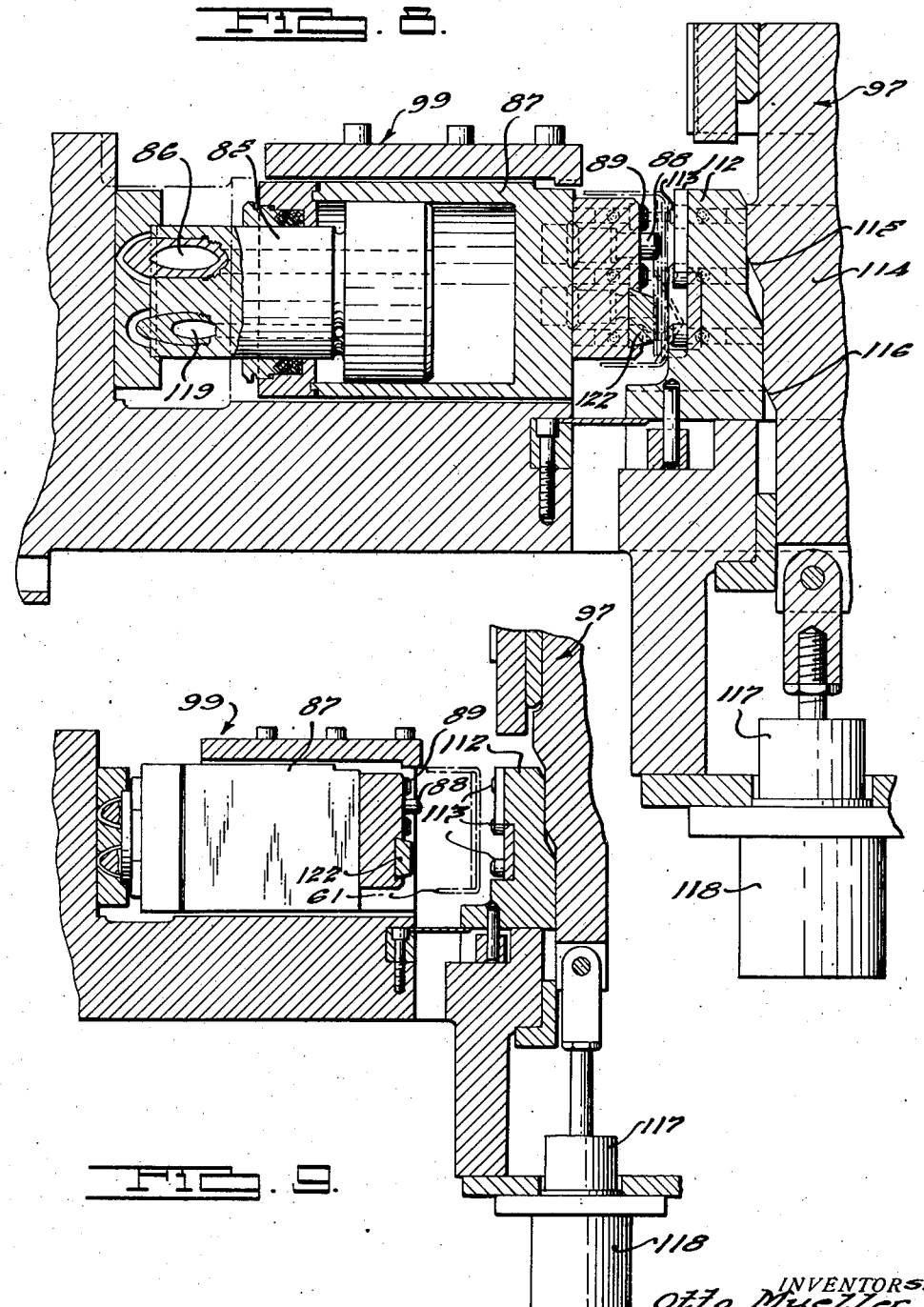

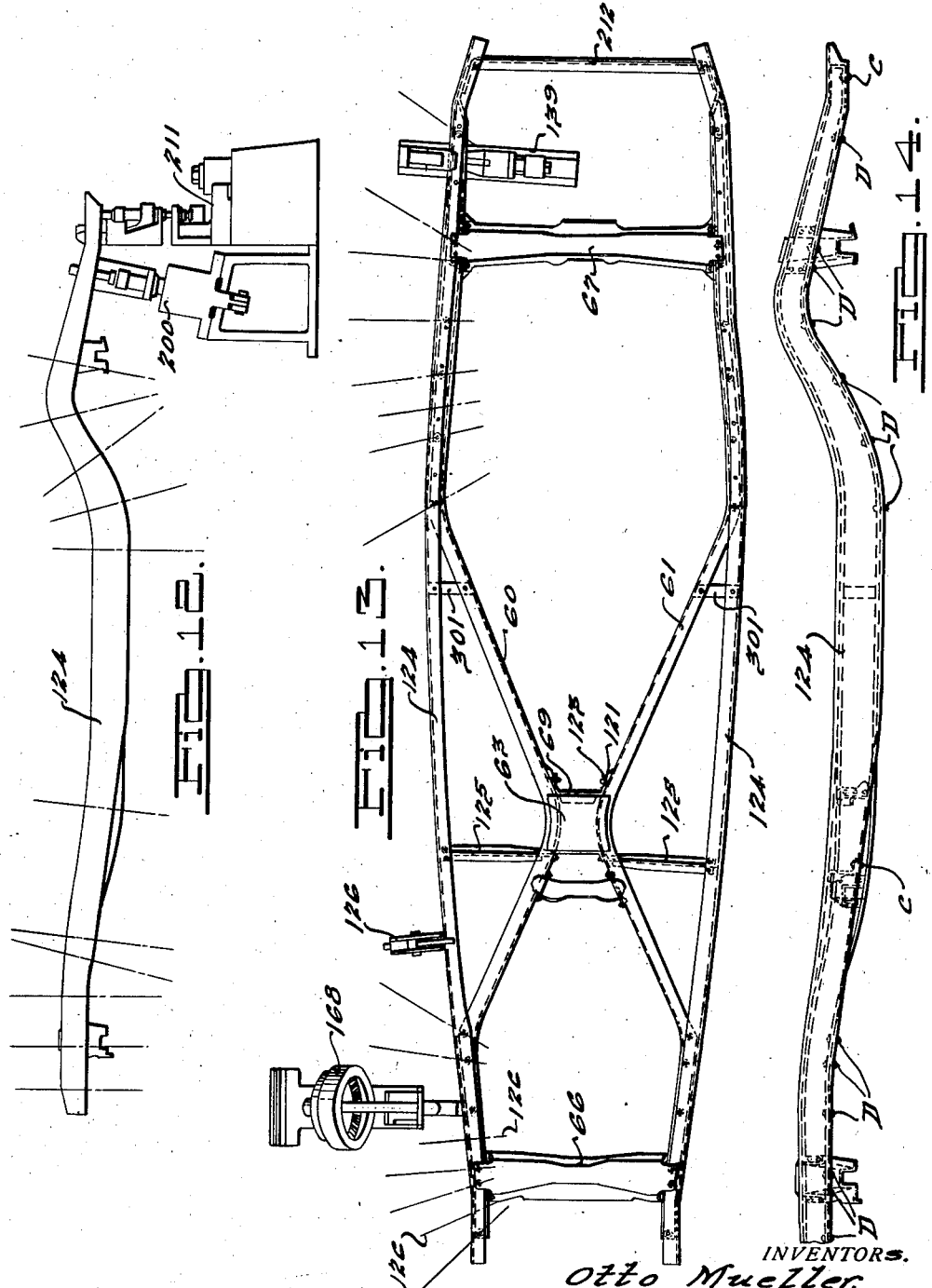

Aug. 15, 1944.    O. MUELLER ET AL    2,355,997
FRAME RIVETING MACHINE
Filed Nov. 28, 1939    29 Sheets-Sheet 8
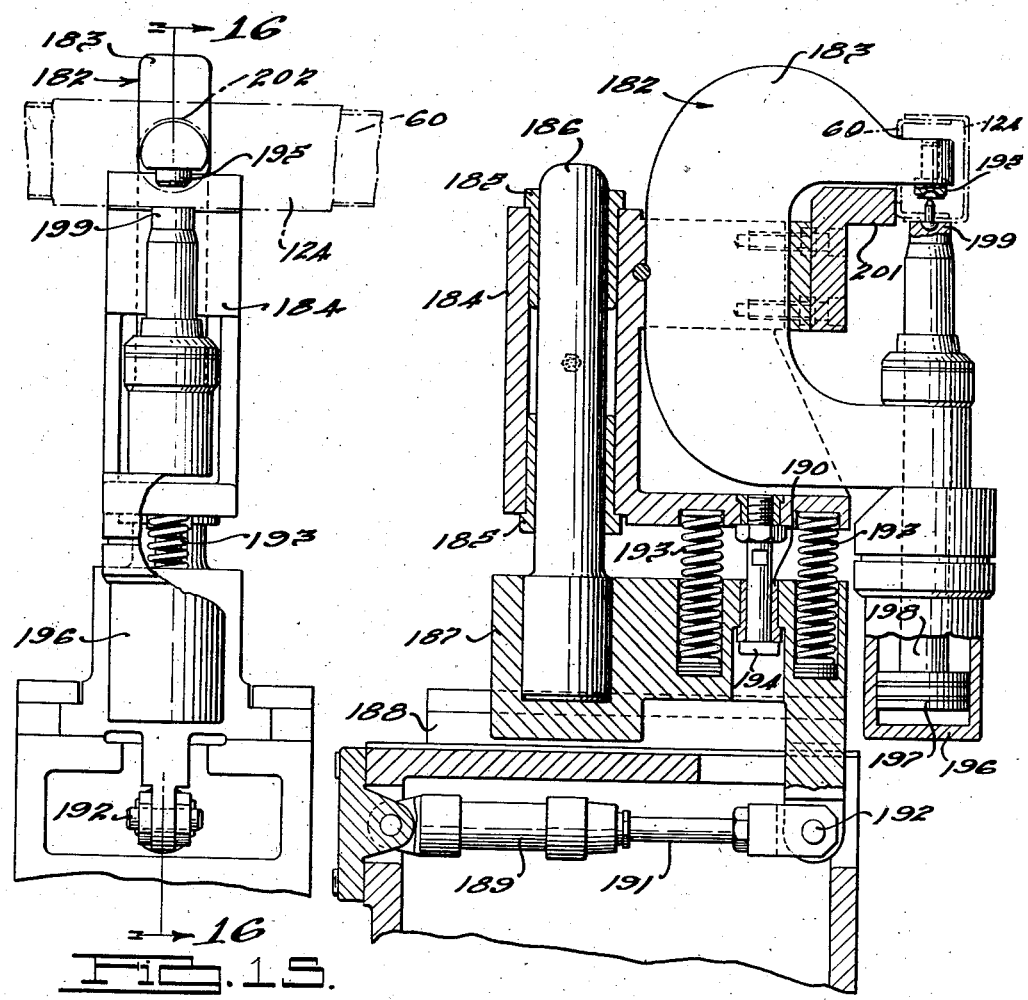
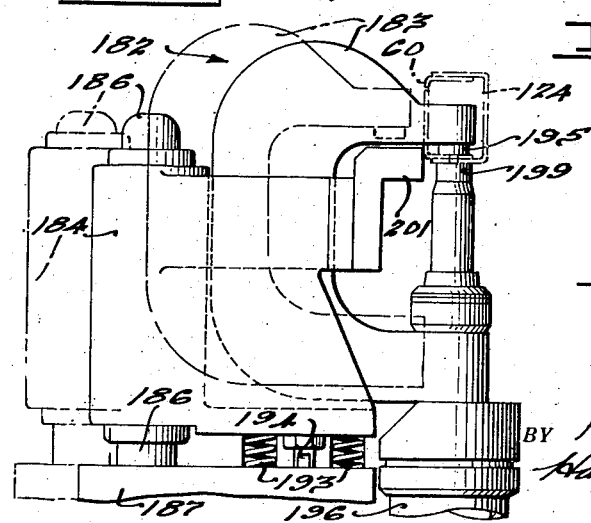

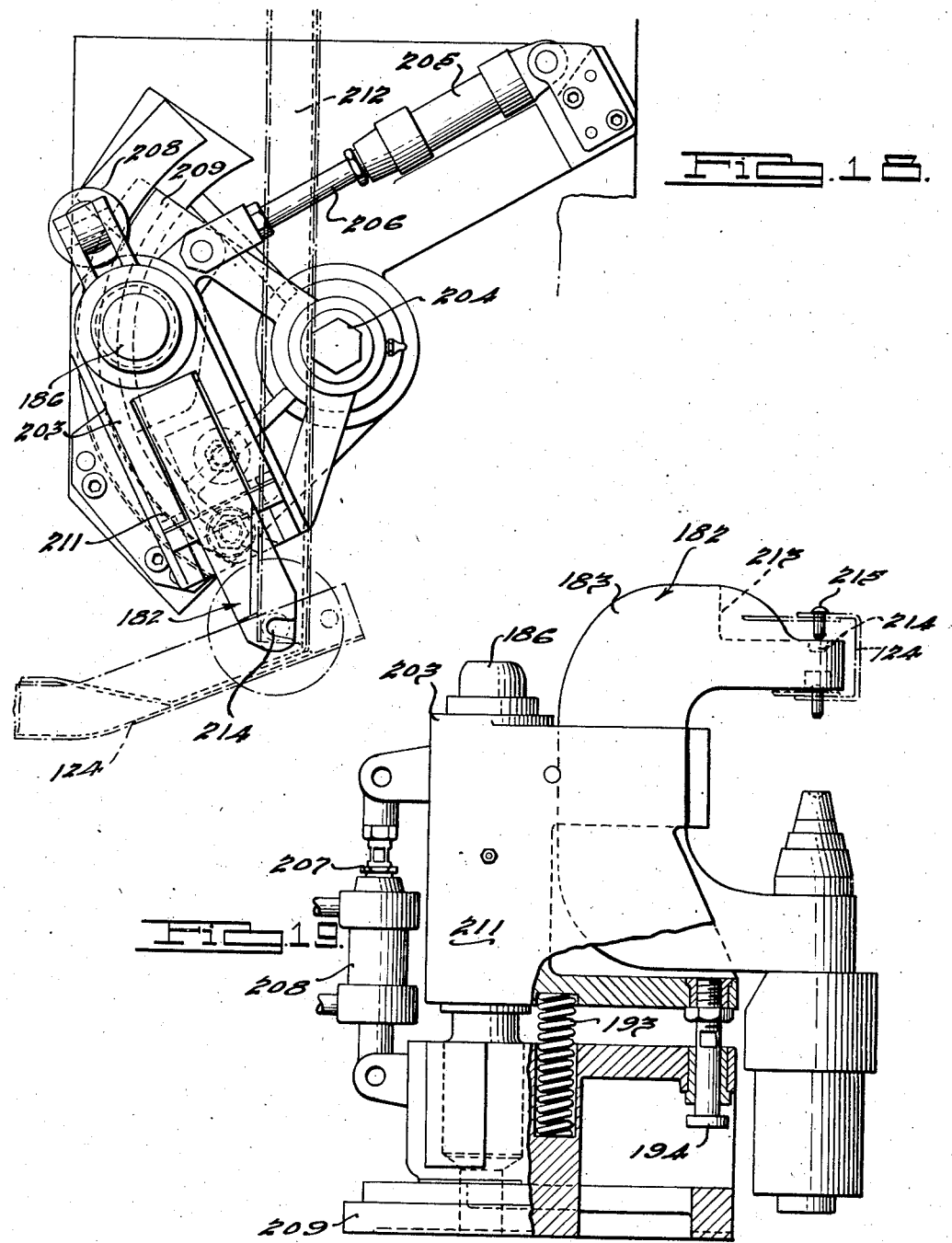

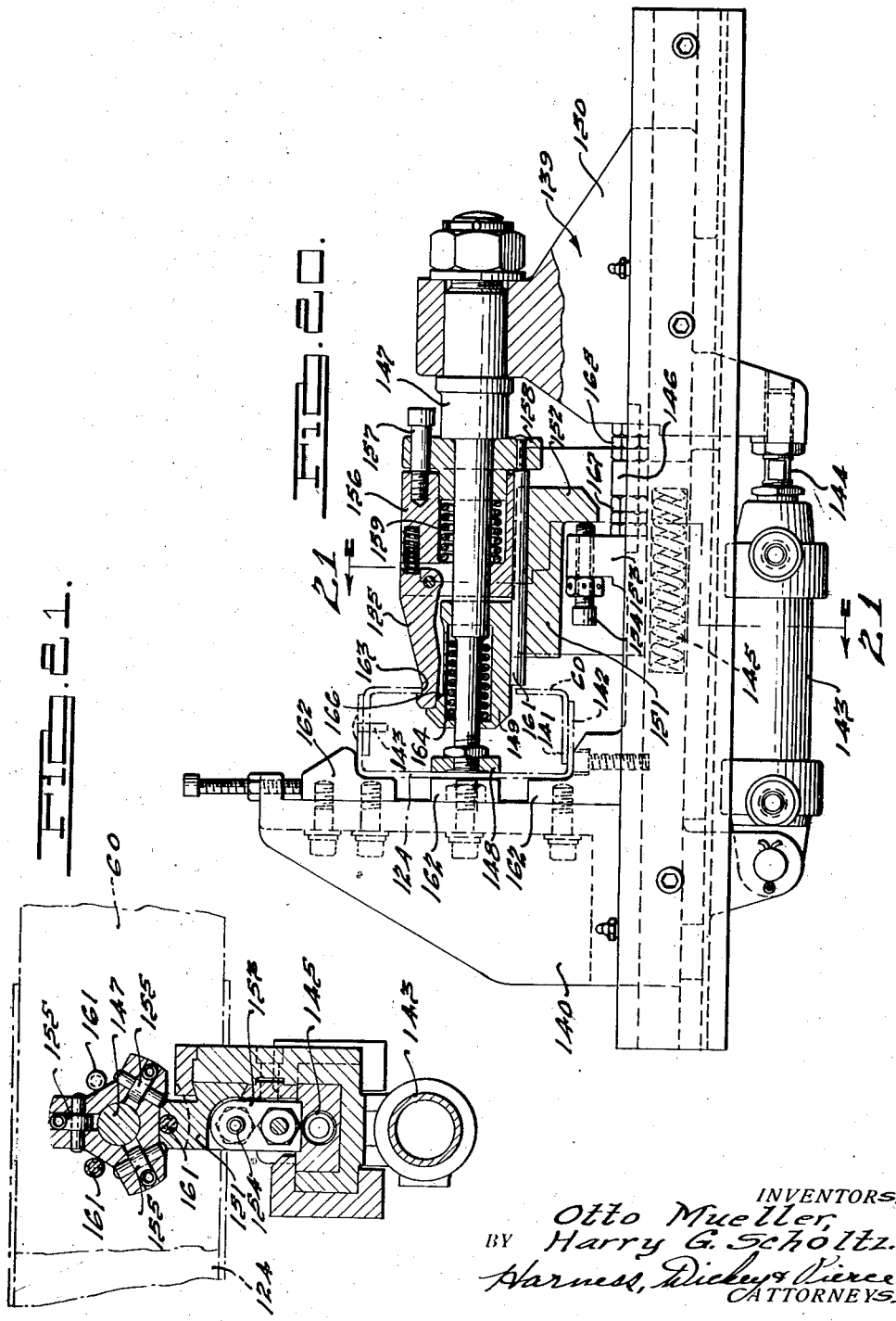

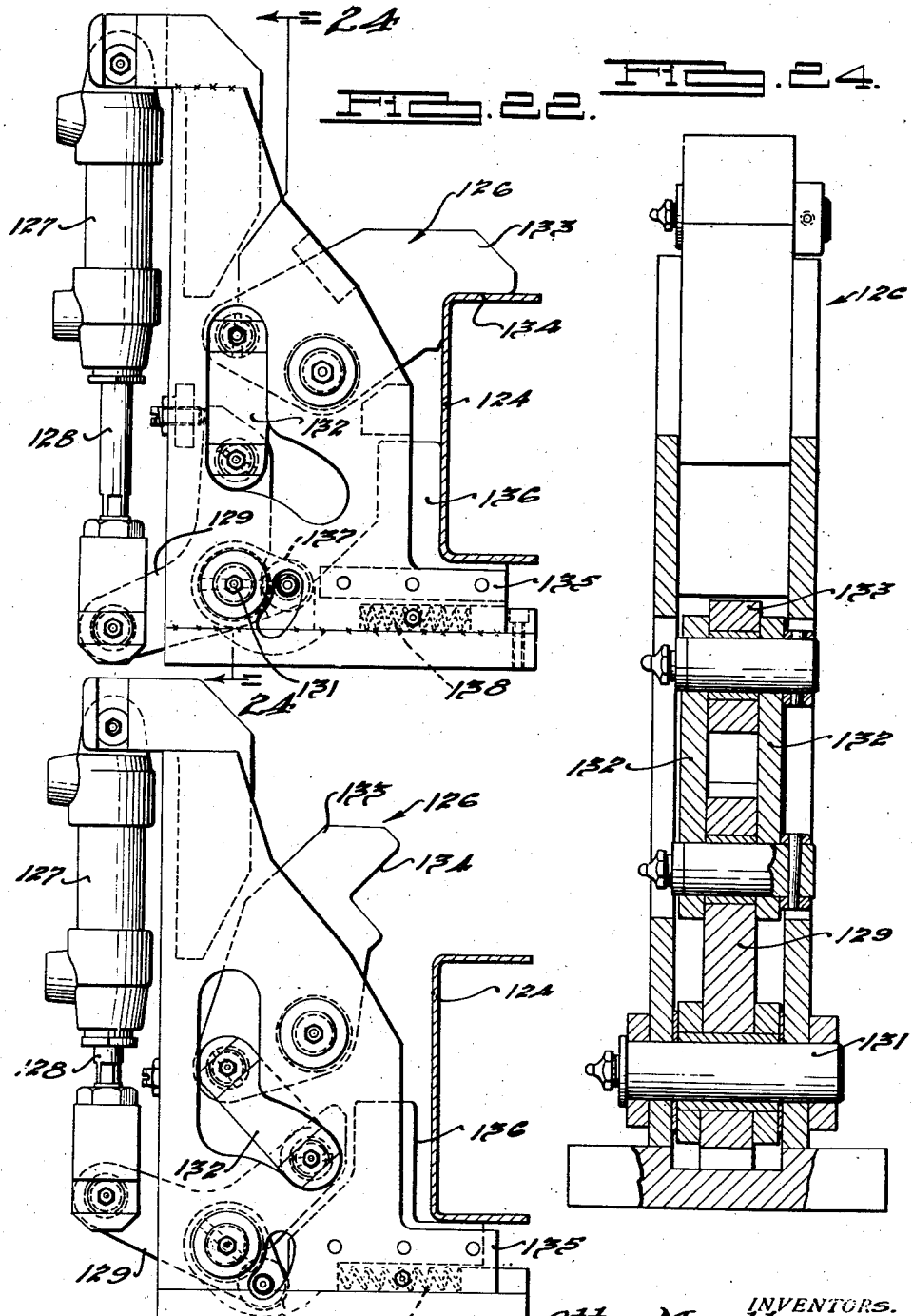

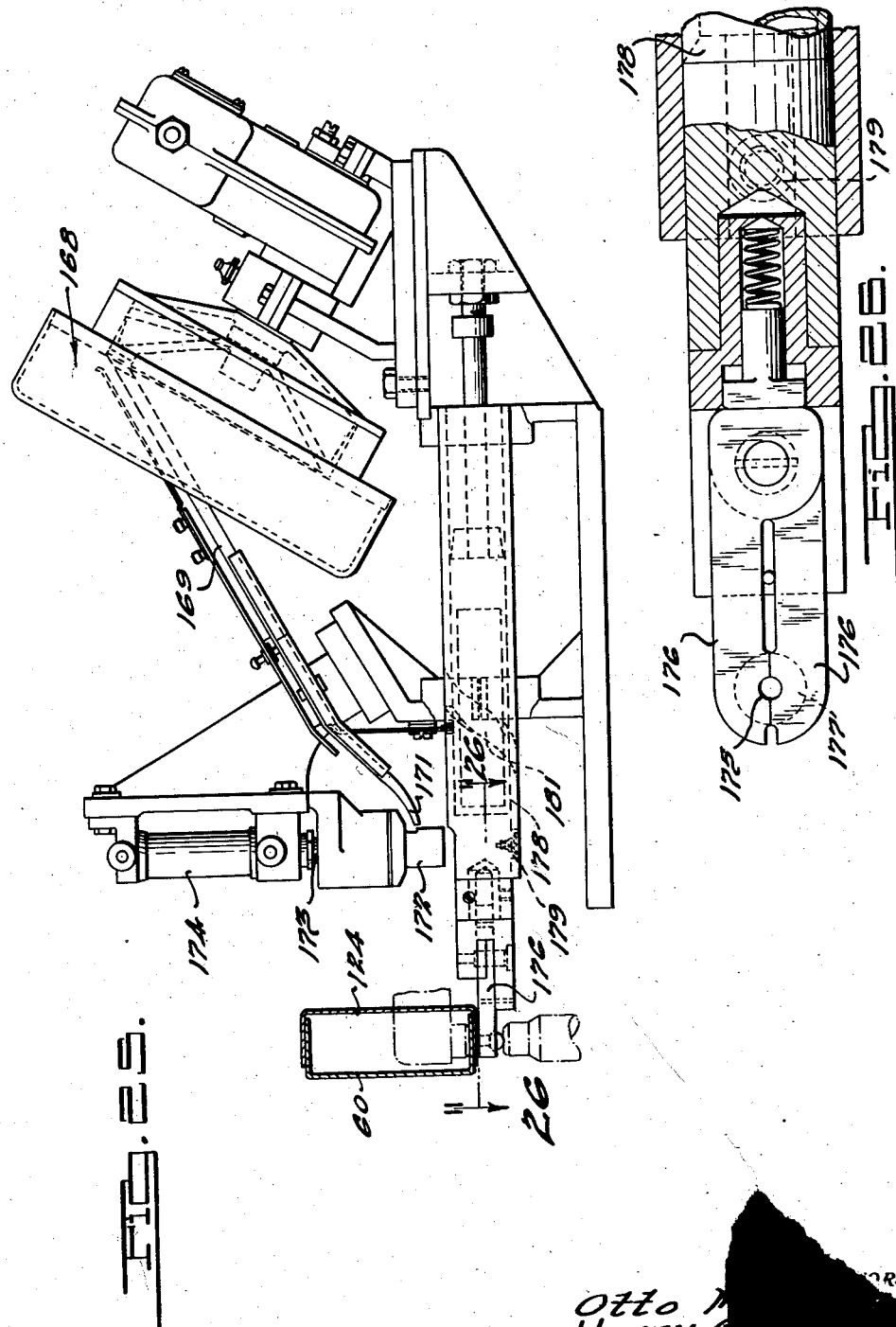

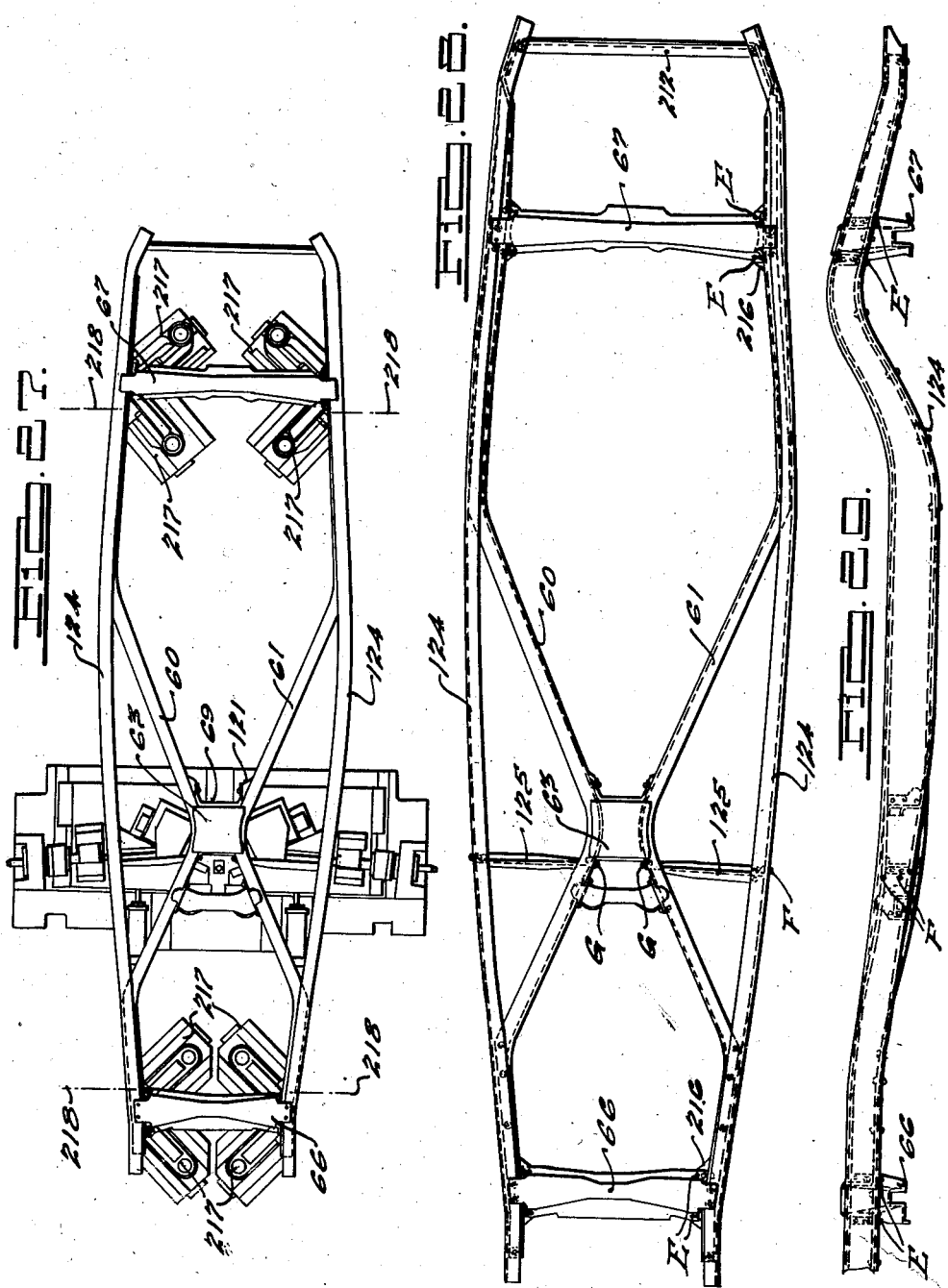

Aug. 15, 1944.    O. MUELLER ET AL    2,355,997
FRAME RIVETING MACHINE
Filed Nov. 28, 1939    29 Sheets-Sheet 14
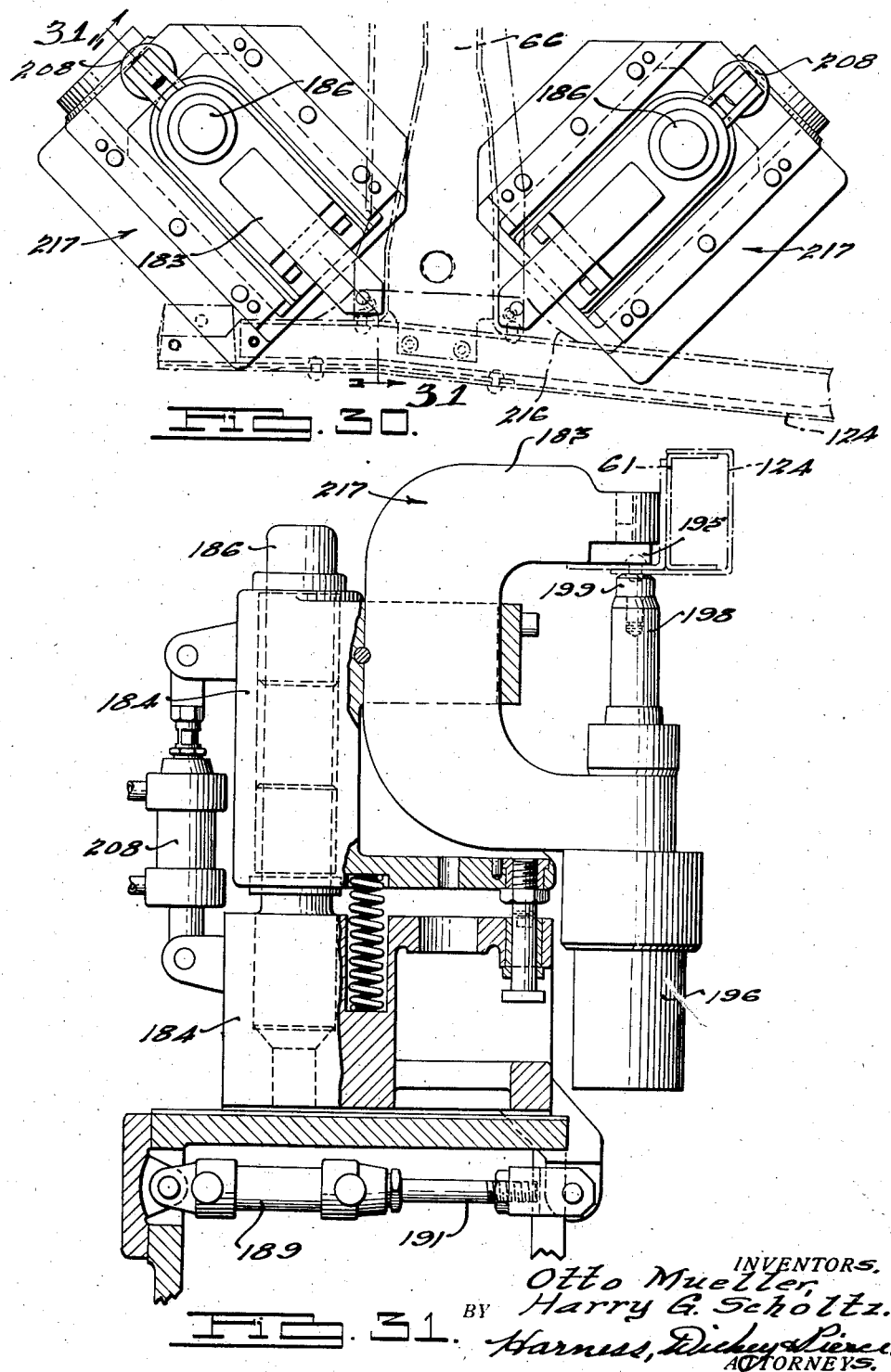
INVENTORS.
Otto Mueller,
Harry G. Scholtz.
BY Harness, Dickey & Pierce.
ATTORNEYS.

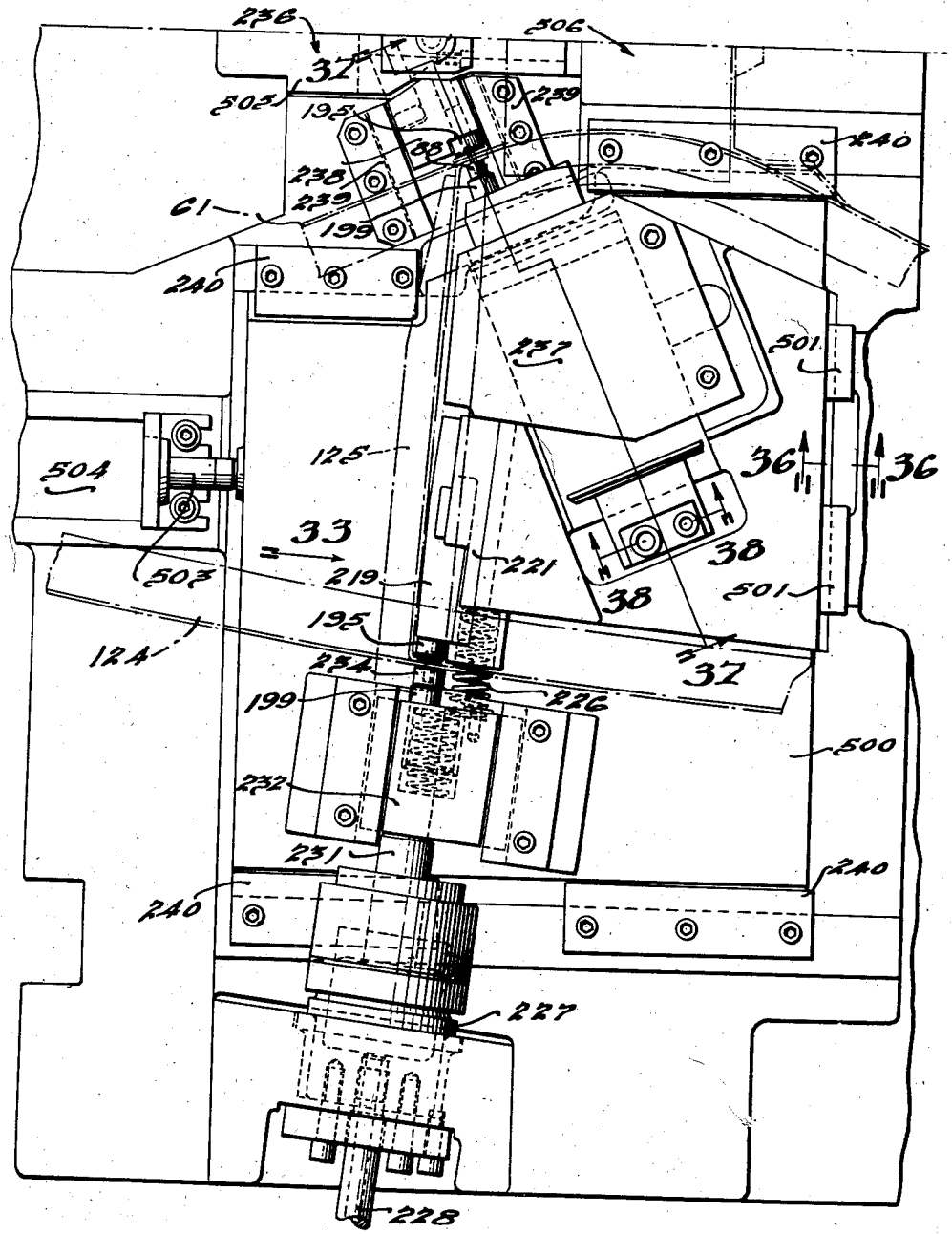

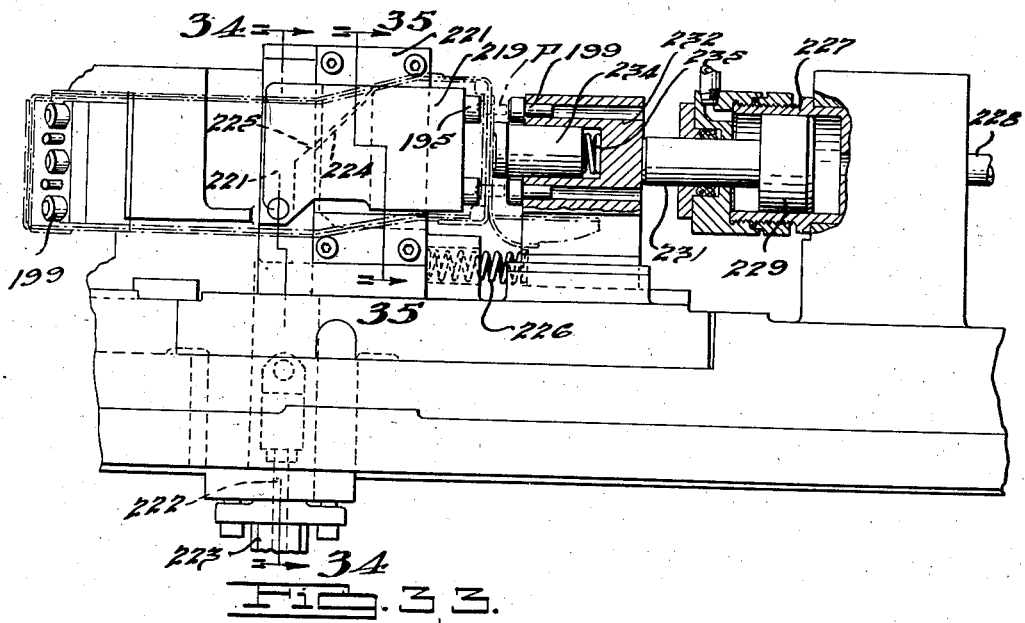
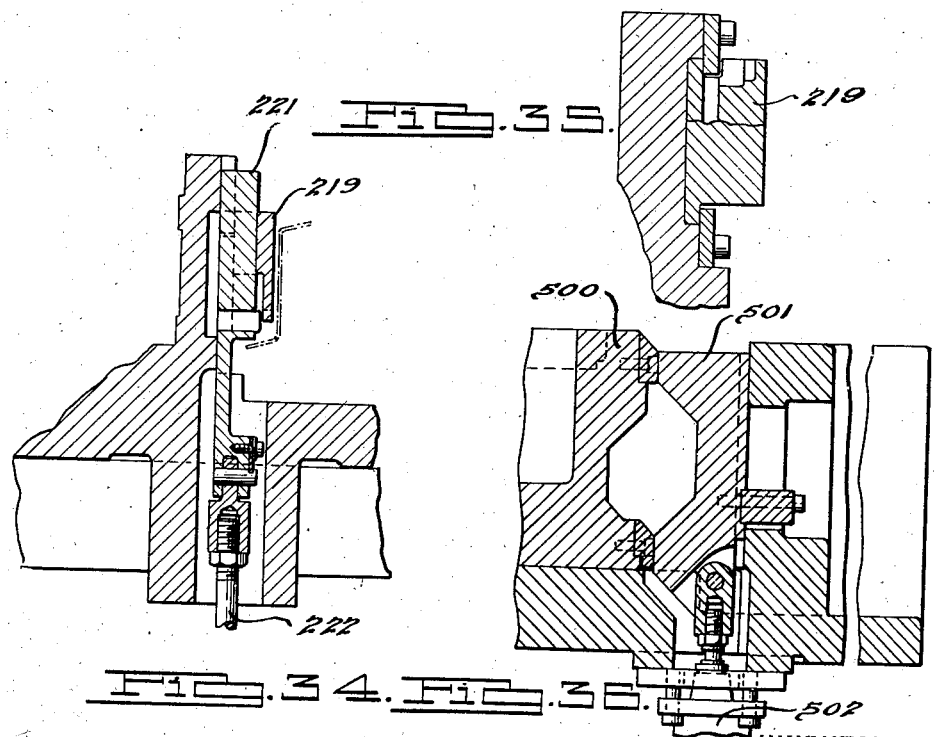

Aug. 15, 1944.   O. MUELLER ET AL   2,355,997
FRAME RIVETING MACHINE
Filed Nov. 28, 1939     29 Sheets-Sheet 17

INVENTORS.
Otto Mueller,
BY Harry G. Scholtz.
Harness, Dickey & Pierce.
ATTORNEYS.

Aug. 15, 1944.  O. MUELLER ET AL  2,355,997
FRAME RIVETING MACHINE
Filed Nov. 28, 1939  29 Sheets-Sheet 18
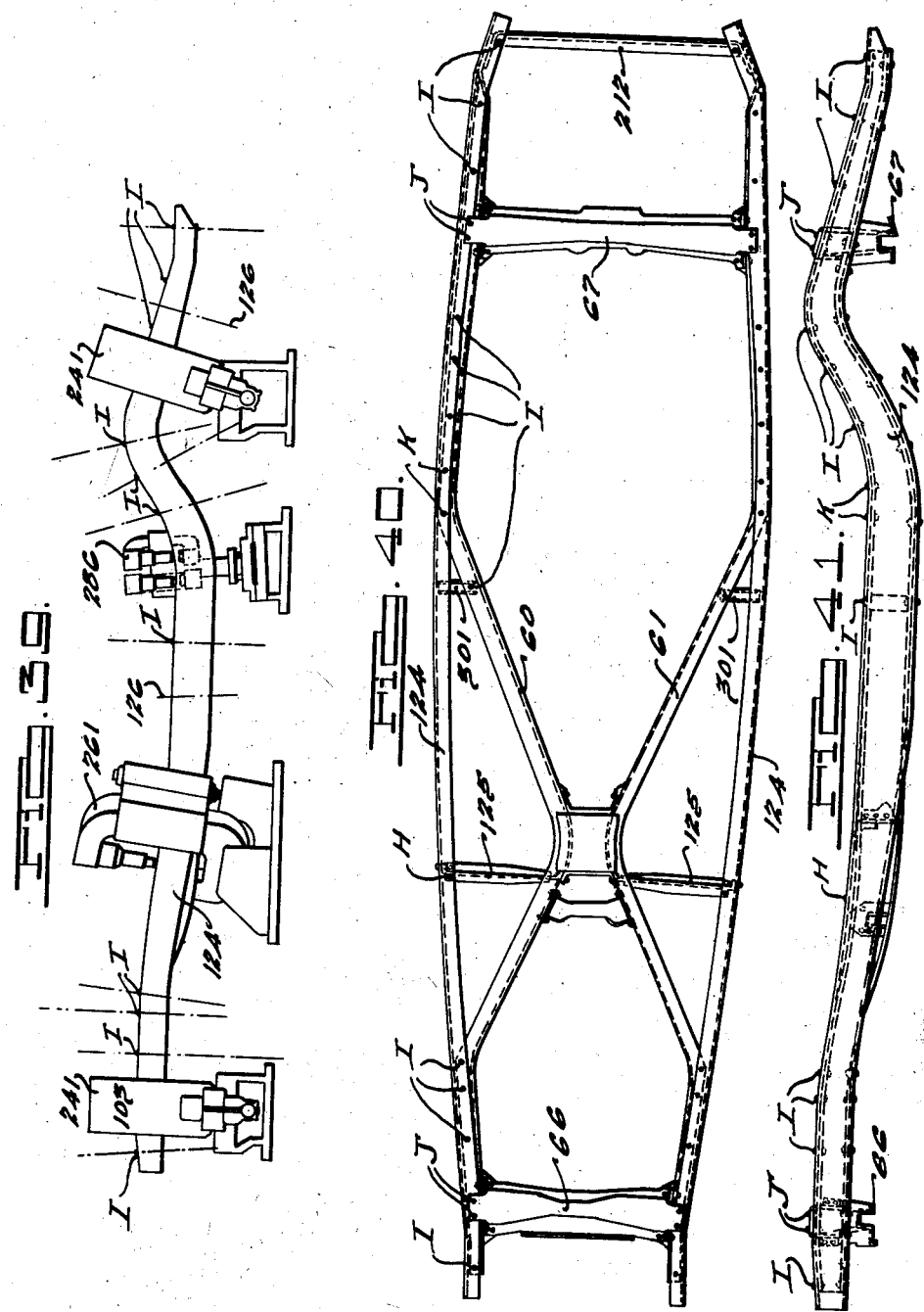
INVENTORS.
Otto Mueller,
BY Harry G. Scholtz.
Harness, Dickey & Pierce.
ATTORNEYS.

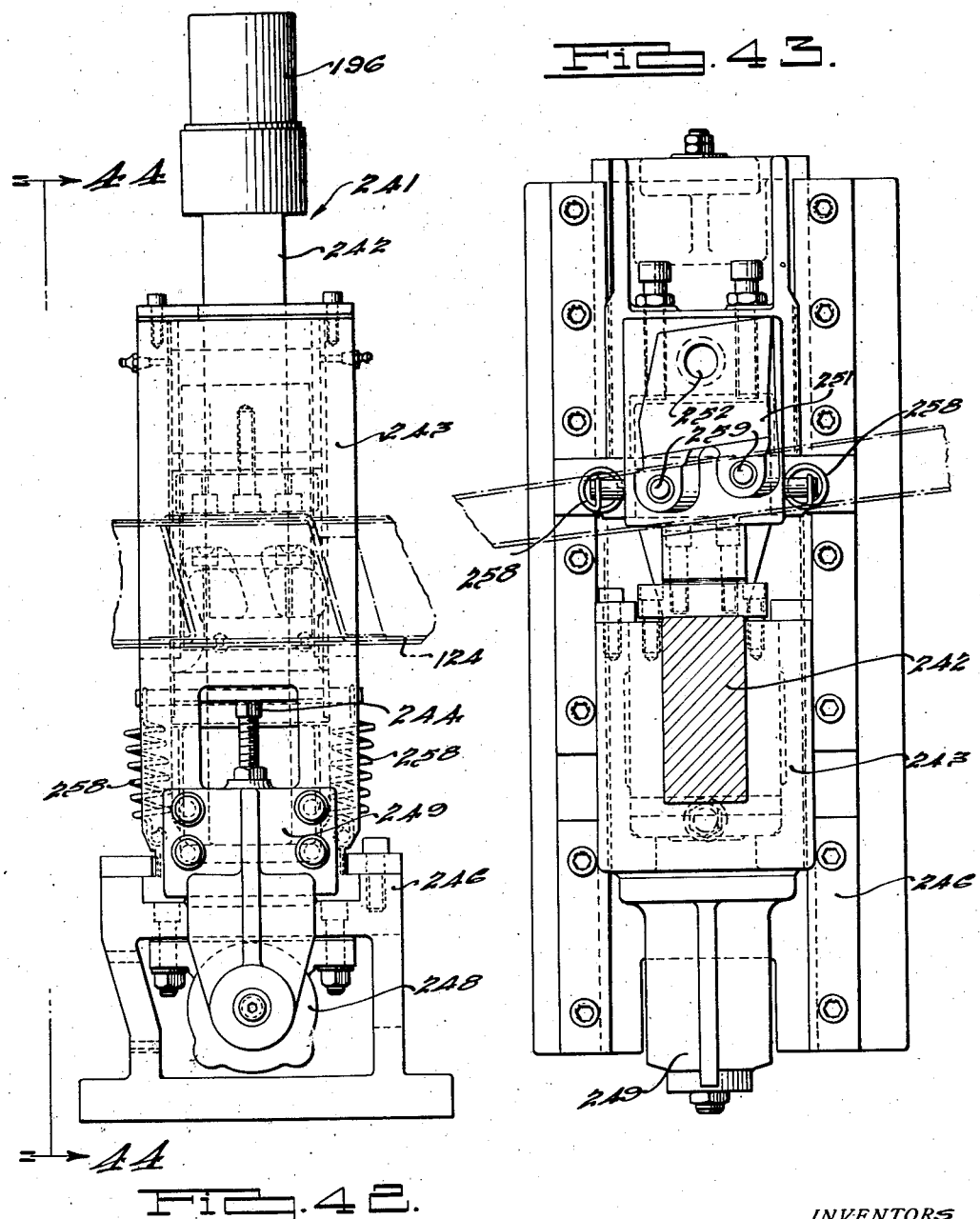

Aug. 15, 1944.  O. MUELLER ET AL  2,355,997
FRAME RIVETING MACHINE
Filed Nov. 28, 1939  29 Sheets-Sheet 20

INVENTORS.
Otto Mueller,
Harry G. Scholtz.
BY Harness, Dickey & Pierce
ATTORNEYS.

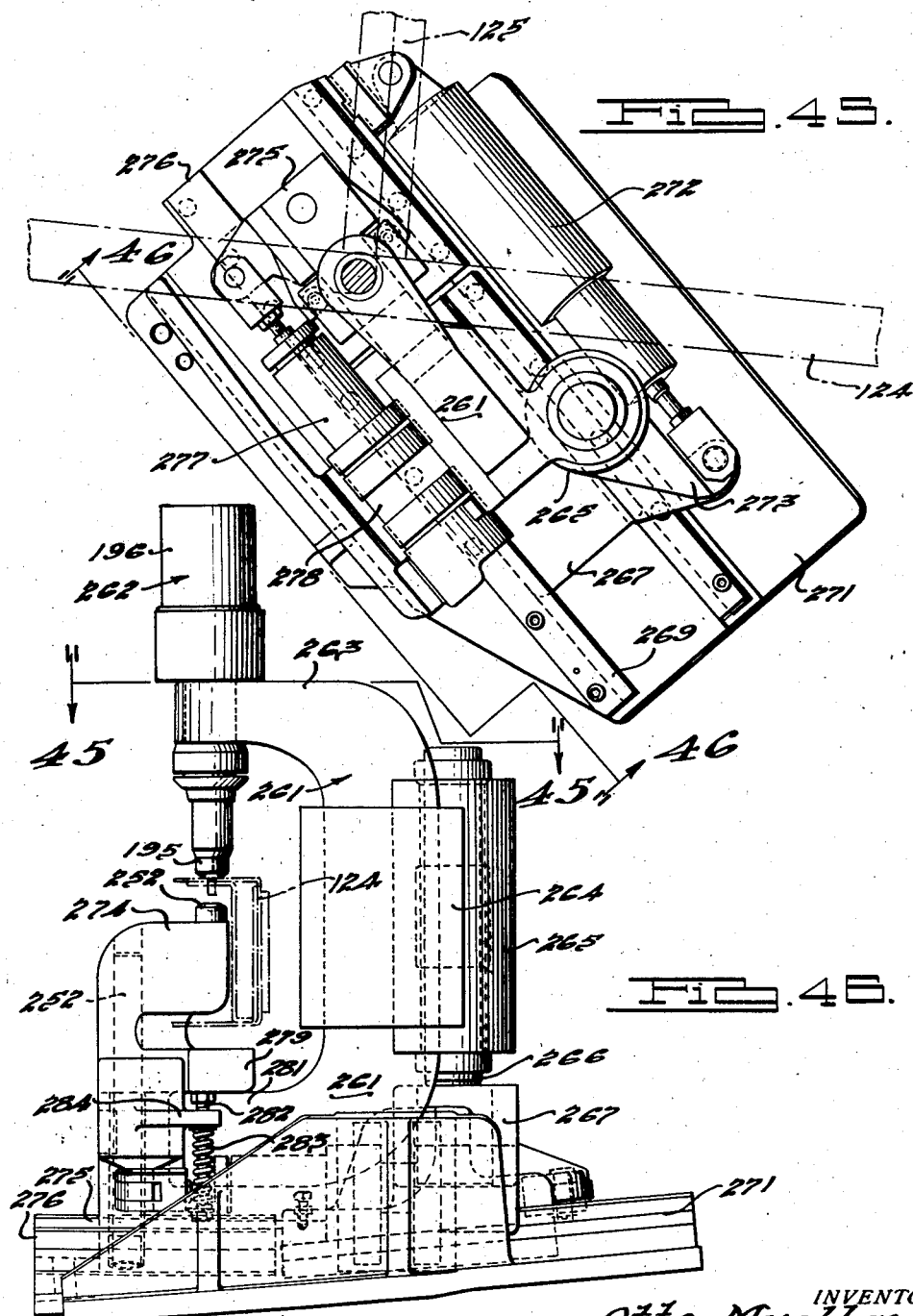

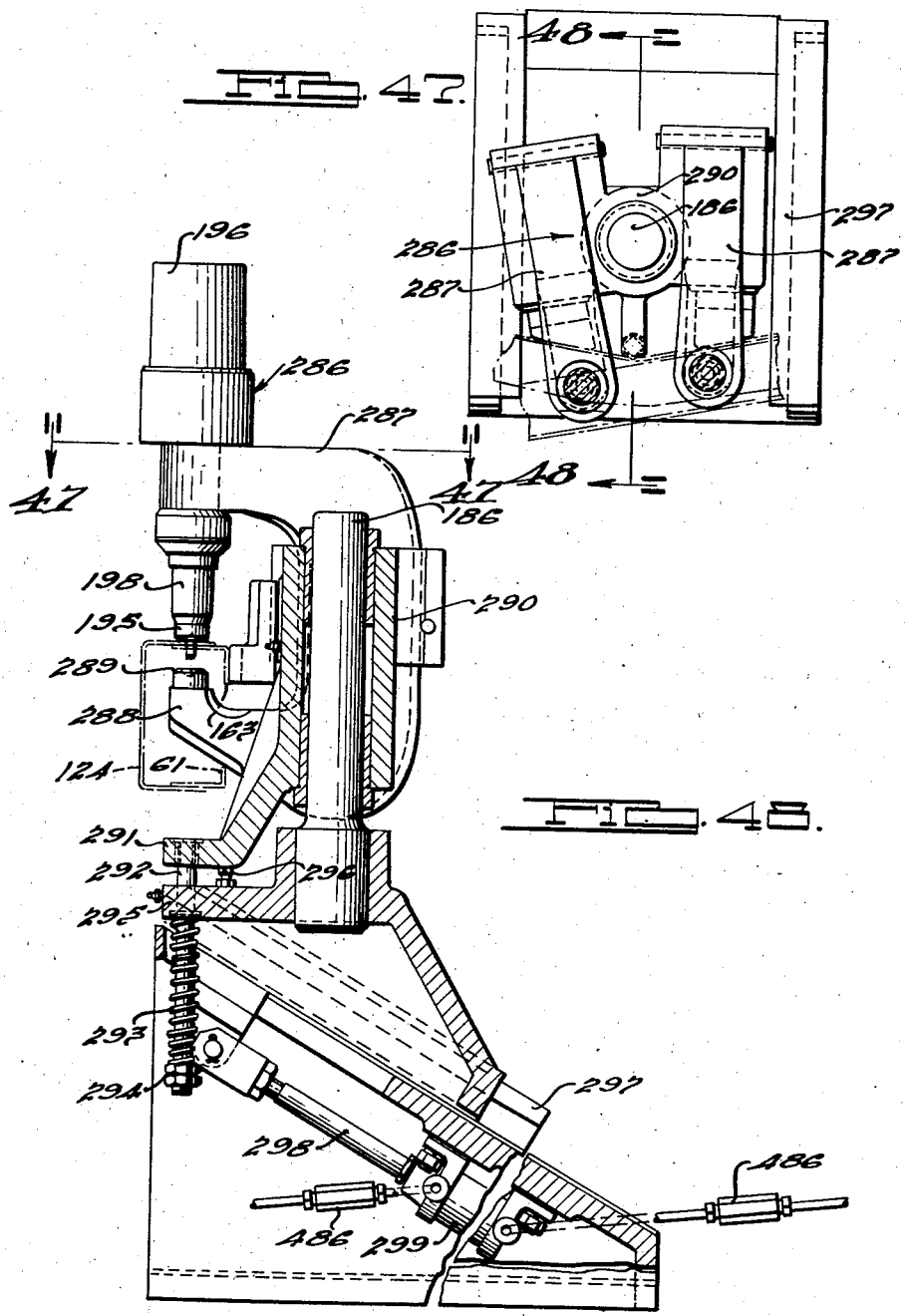

Aug. 15, 1944.    O. MUELLER ET AL    2,355,997
FRAME RIVETING MACHINE
Filed Nov. 28, 1939    29 Sheets-Sheet 23
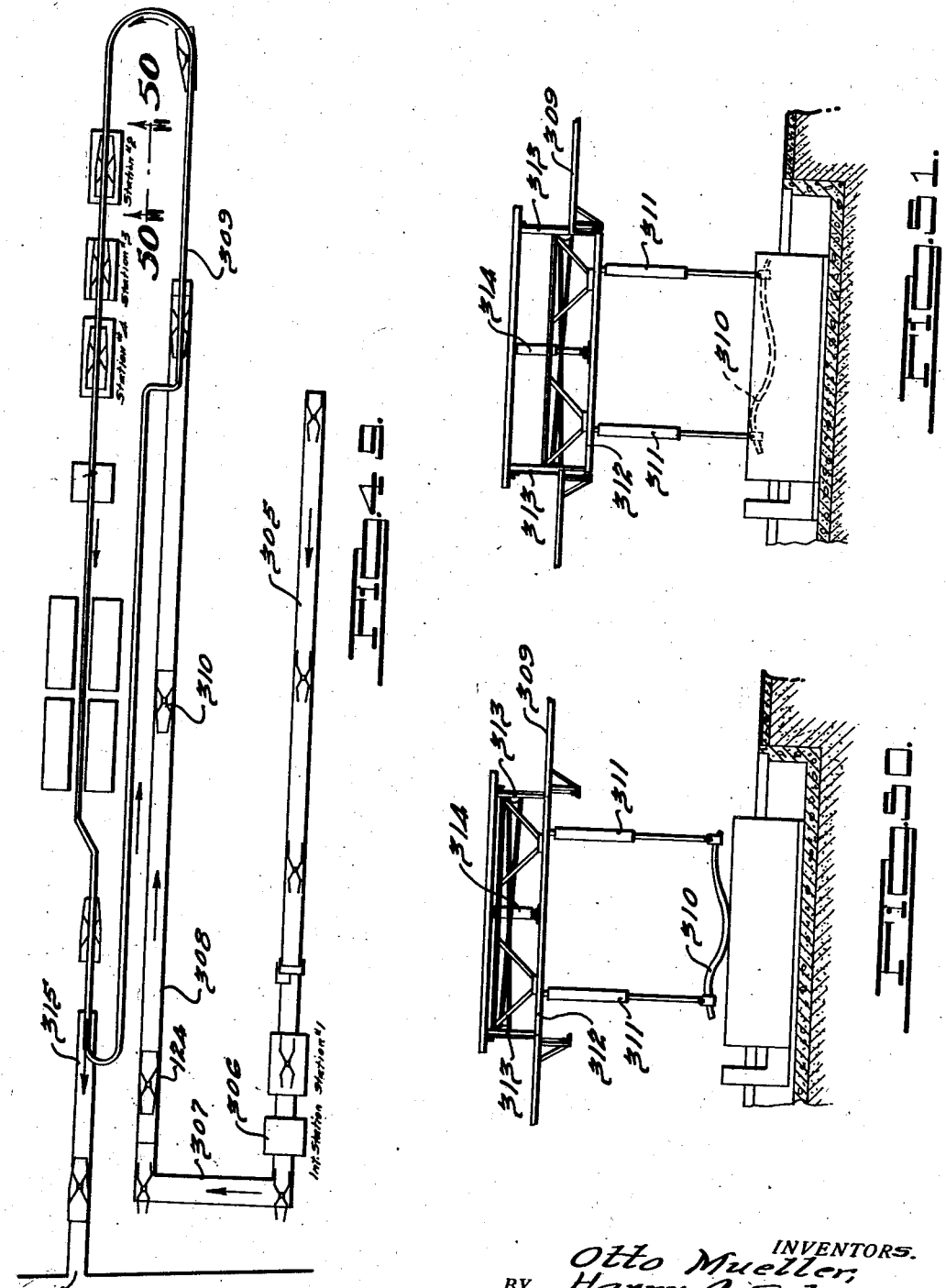
INVENTORS.
Otto Mueller,
BY Harry G. Scholtz.
Harness, Dickey & Pierce
ATTORNEYS.

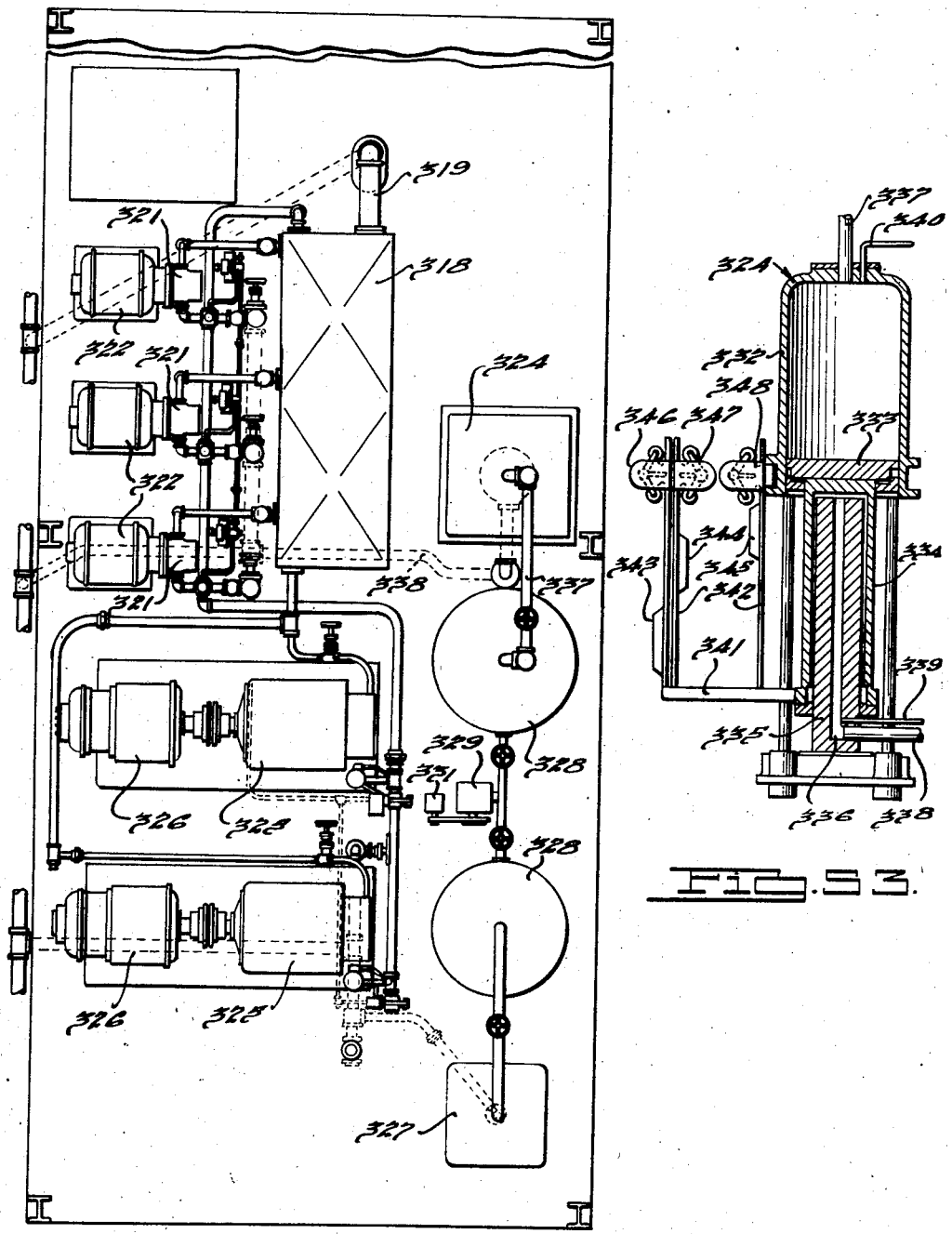

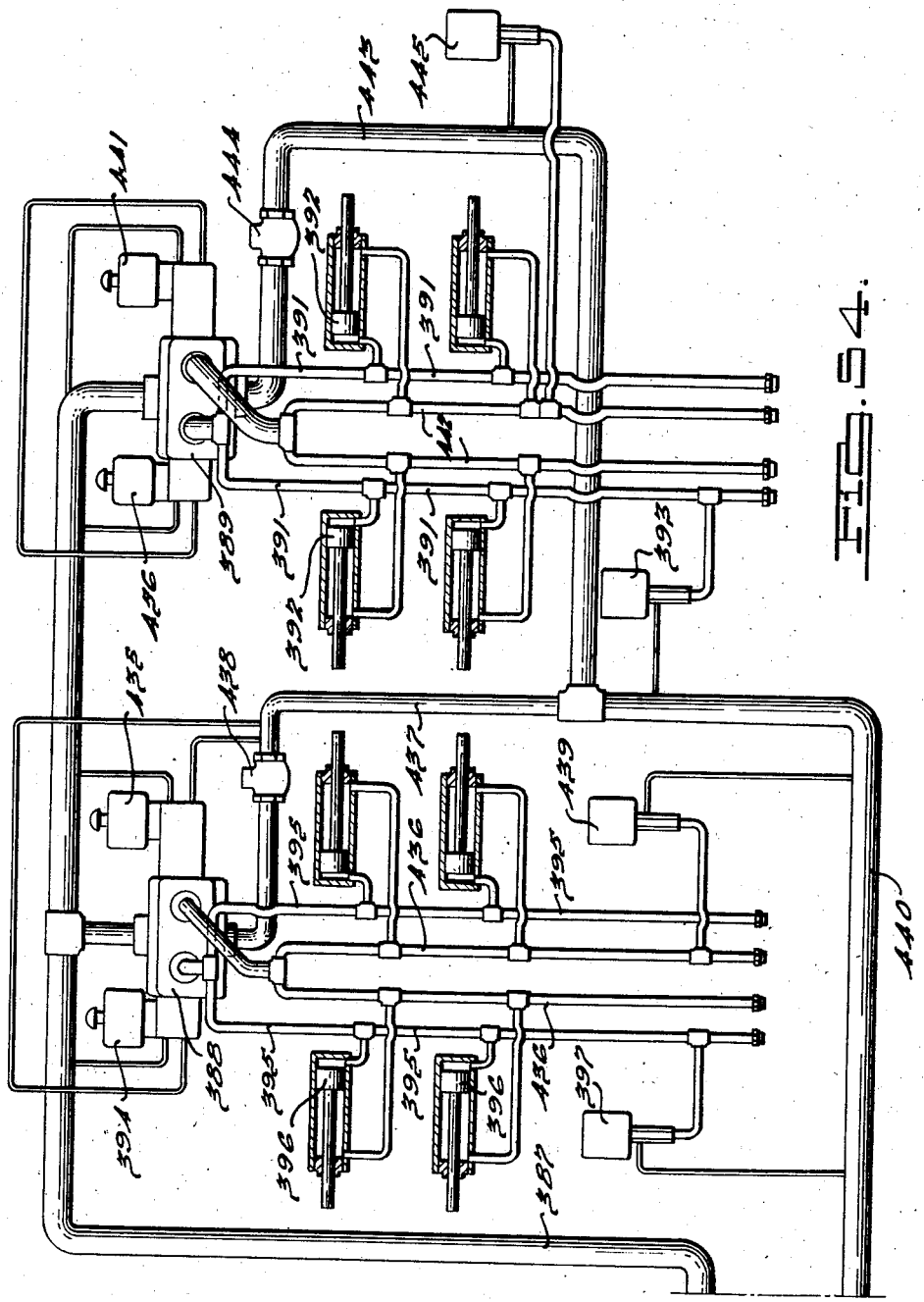

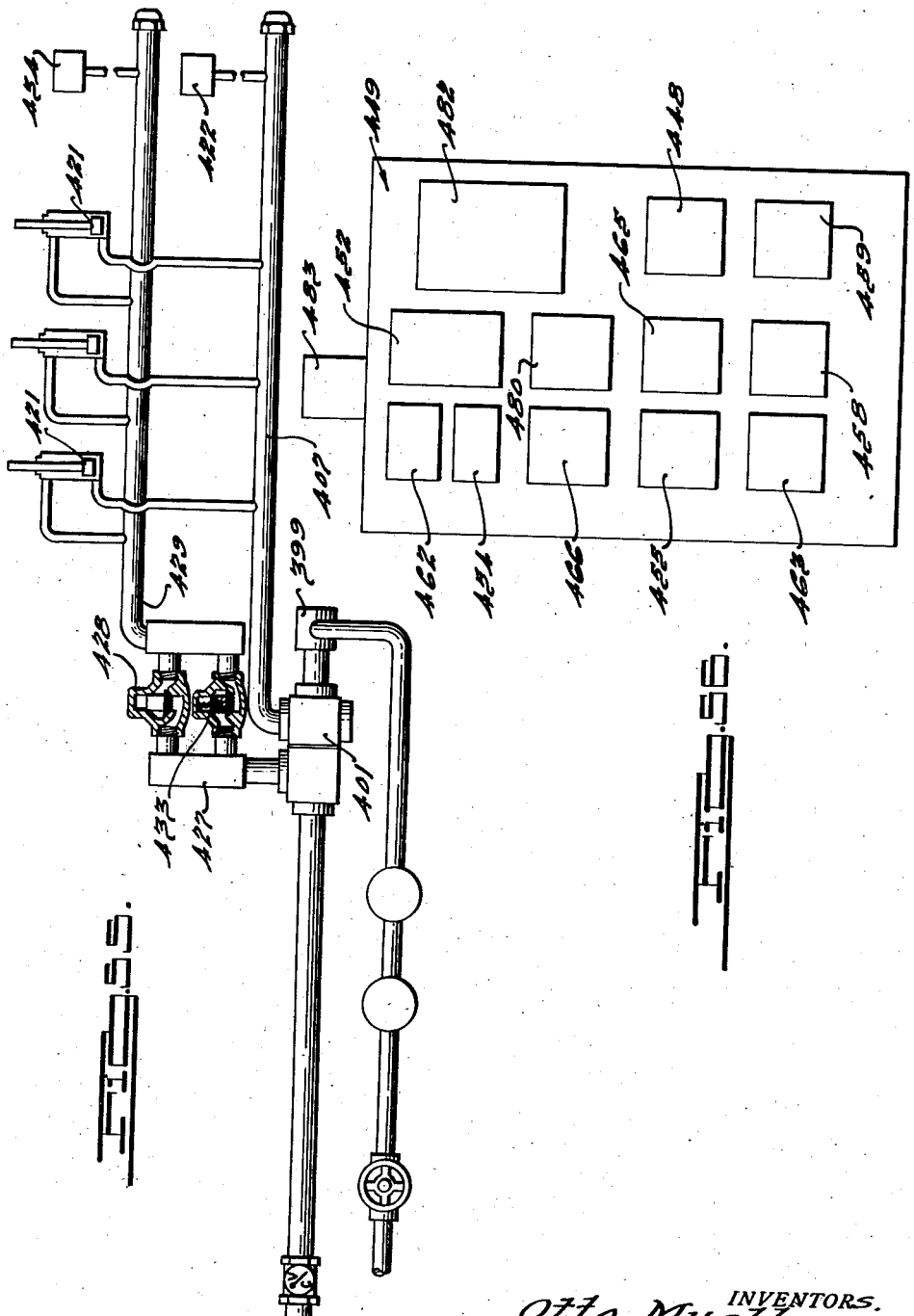

Aug. 15, 1944.  O. MUELLER ET AL  2,355,997
FRAME RIVETING MACHINE
Filed Nov. 28, 1939   29 Sheets-Sheet 27
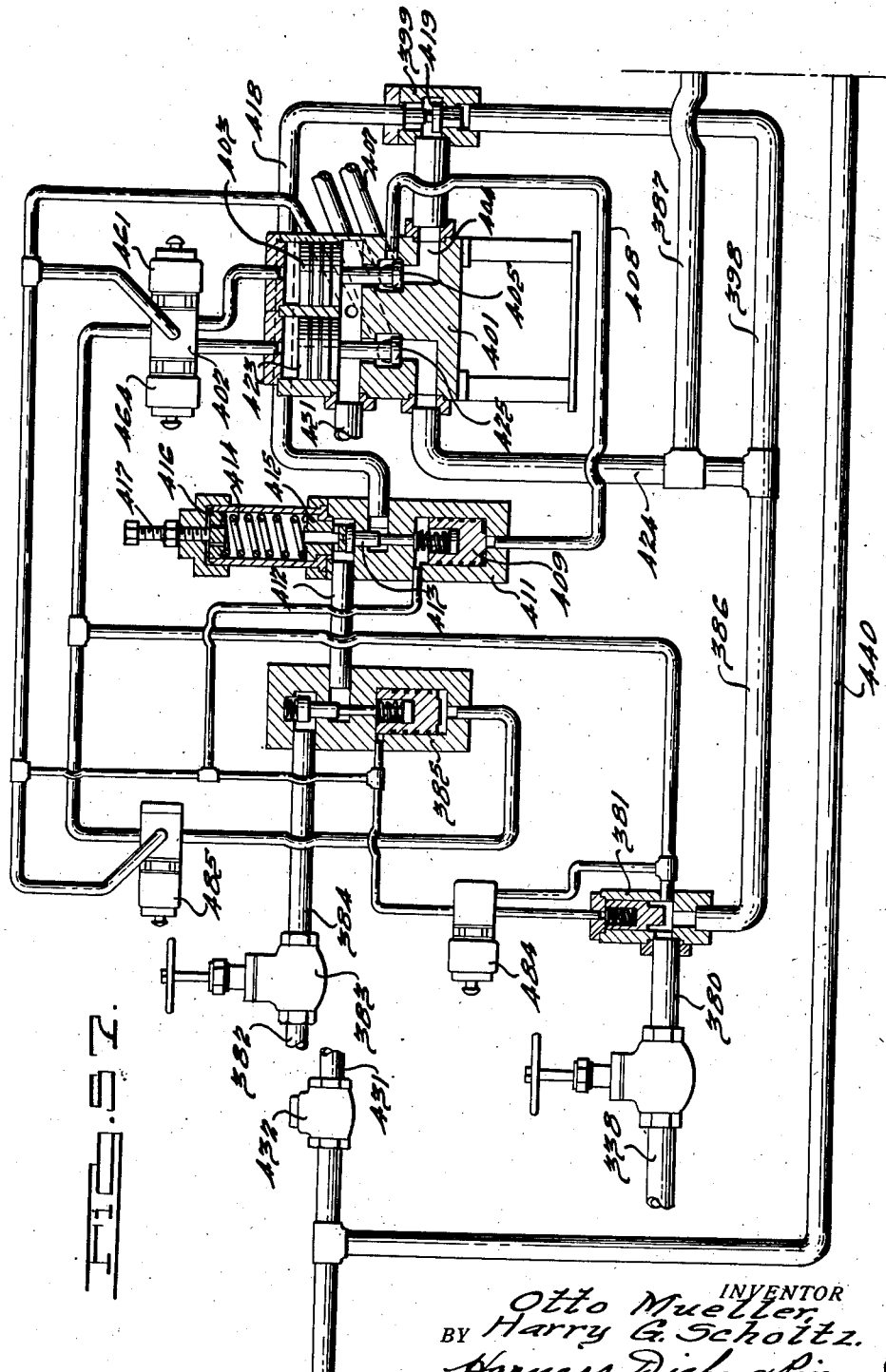
INVENTOR
Otto Mueller
BY Harry G. Schoitz
Harness, Dickey & Pierce
ATTORNEYS.

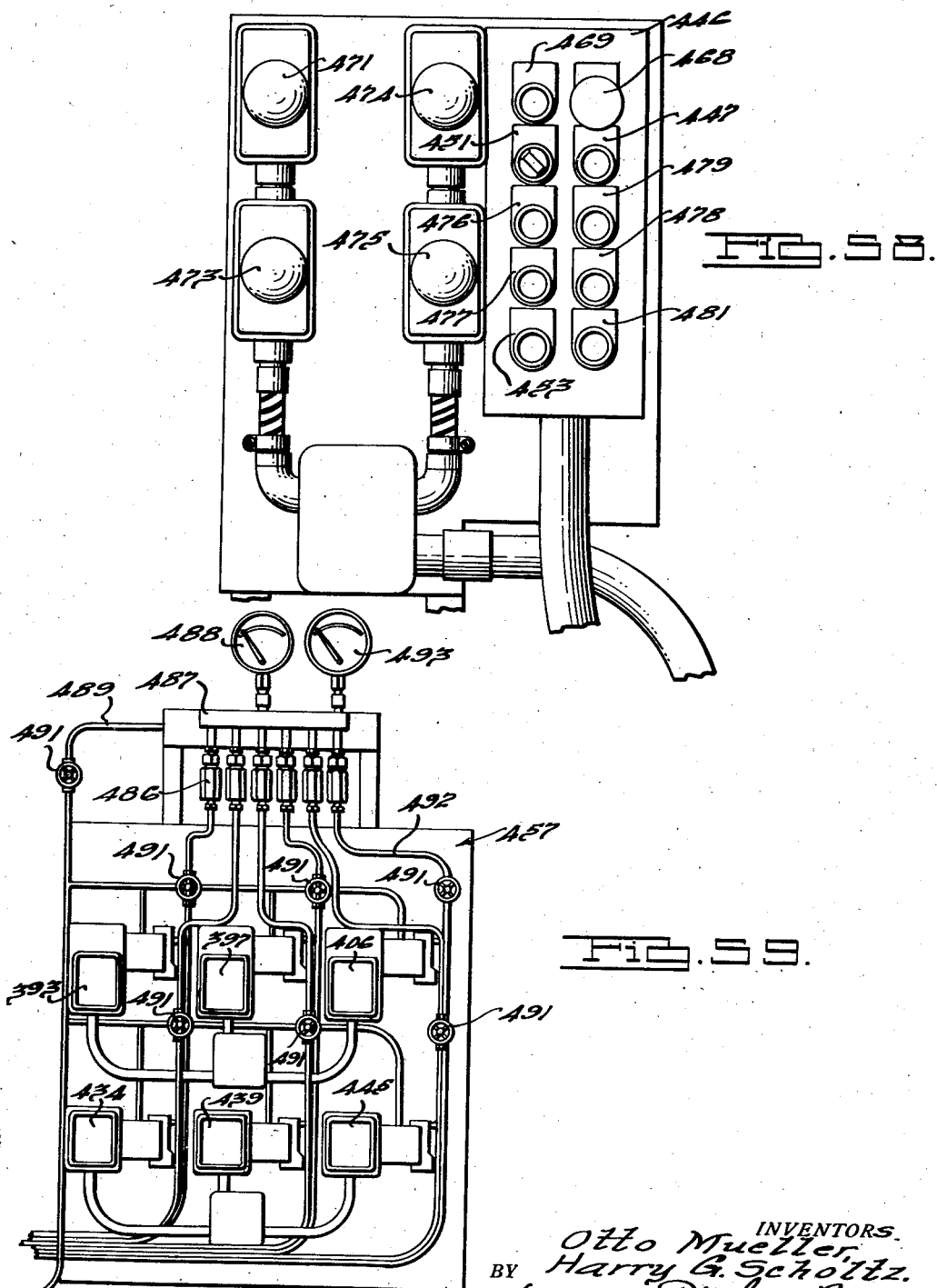

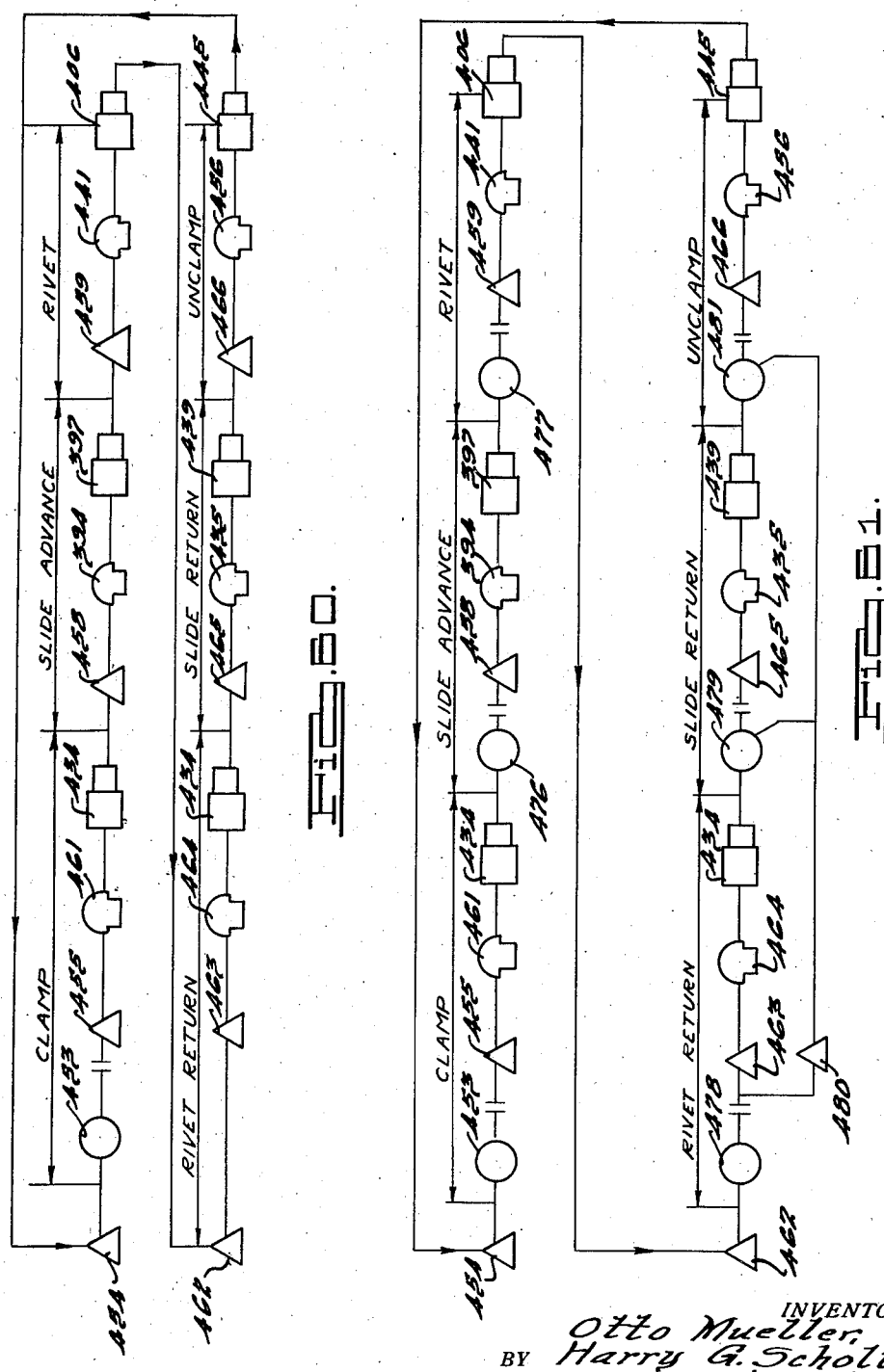

Patented Aug. 15, 1944

2,355,997

UNITED STATES PATENT OFFICE 2,355,997

FRAME RIVETING MACHINE

Otto Mueller, Dearborn, and Harry G. Scholtz, Wyandotte, Mich., assignors to The Murray Corporation of America, Detroit, Mich., a corporation of Delaware Application November 28, 1939, Serial No. 306,542

16 Claims. (Cl. 78—49)

Our invention relates to means and apparatus for riveting chassis frame stampings, and particularly to means for assembling pressed metal parts of chassis frames to form box section structures which are secured together by riveting operations.

Heretofore in the art, chassis frames were usually constructed of channel side rails interconnected by braces to form a rigid construction for supporting a vehicle body and engine on the vehicle wheels. Some frames were made with the channel presenting inwardly or outwardly, while others were constructed with the channel presenting downwardly. Some box section channel side rails were constructed by flanging the downwardly presented side walls outwardly and welding a plate to the flanges. The elements of the chassis frame were assembled either by welding or by riveting when attempting to produce a chassis frame of assured strength at all joints. Riveting is the preferred method of securing the parts together, as assurance is always had that the parts are securely fastened.

When assembling a chassis frame having sills of box section construction with a riveting method, serious problems developed when attempting to affect such riveting operations in commercial production. That is to say, by progressively assembling the stampings together and riveting portions of the assembly as the assembled frame is advanced from one stage to another where certain of the rivets are swaged.

The chassis frame illustrated is reinforced by a central X member, both ends of which are joined to the chassis side sills at the forward and rear ends in box section arrangement. The X member, constituting the central portion of the frame, is constructed of outwardly presented channel elements while the outer chassis sills are constructed of inwardly presented channel elements. The central X portion of the frame is extended to provide end portions in the plane of the chassis side sills. These end portions mate with the side sills and form the box section construction, the telescoped ends of which are joined together by rivets.

Four new and novel stages of riveting were developed to effect the riveting of the X member, side sill members, the braces, and engine supporting stampings together into a unit construction. The first stage secures the forward and rear braces, the central brace, and the engine mounting bracket to the outwardly presented channel elements forming the X member. At an intermediate stage the top and bottom vertical rivets of the central X member portions are swaged. After these parts are riveted together the side sill elements and additional braces are secured to the assembled X member by rivets, most of which are inserted in the frame before the assembly is advanced to the second riveting station. The bottom rivets of the box section assembly formed between each of the X members and the side sill members are automatically inserted in the second riveting stage.

Clamps are employed for clamping the assembled frame in predetermined position within the riveting units of a station while additional devices are employed for spacing the webs of the ends of the X member relative to the webs of side sill members. In this manner the bottom holes in the X member and the sill members are aligned to permit the rivets advanced by the rivet delivering members, to be inserted in the aligned holes in the mated flanges by the riveting devices which are advanced to a position to engage the rivets and affects the swaging operations. The riveting devices are advanced through openings in the webs of the X member so as to project within the box section structure in alignment with the rivets. After the swaging operations the riveting devices are moved away from the chassis frame elements, the clamps are then released and the chassis frame is moved from the units of the second riveting stage and advanced to the units of the third riveting stage.

In the third stage, the bracing elements are secured to the webs of the chassis side members and to the X members by riveting devices and other devices swage the vertically disposed rivets. The chassis frame is then moved to the fourth stage where the remaining top rivets in the box section structure are swaged to produce the final riveting operations on the chassis frame.

Similar clamps are employed in the second, third and fourth riveting stages for securing the chassis frame assembly relative to the riveting devices of any particular stage. The riveting devices function in substantially the same manner, being advanced to riveting position, thereafter operated to effect the swaging of certain of the rivets and finally released from the rivet and moved away from the chassis frame. Thereafter the clamps are then released, permitting removal of the chassis frame from the units of the stage.

A unique combined electric and fluid control system is employed for controlling the operation of the various clamps, slides, and riveting devices at the various stages. A central power plant provides two stages of fluid pressure, one stage at low pressure up to 1000 lbs. per square inch, and another stage of high pressure up to 5000 lbs. per square inch. The fluid of the low stage operates clamps and slides and for initially moving the riveting devices in position to engage the rivets and for thereafter engaging the rivet. The fluid of the high pressure stage functions to actuate the riveting devices further to perform the swaging operations. Automatic control means is provided for controlling the complete operation in each of the stages automatically or the operation of the devices may be produced in sequence manually by the manipulation of switches in a predetermined order. Switches are also provided at each stage so that when desired, or in an emergency, the operation may be stopped at any point.

The assembly of the chassis frame units occurs before and after the first stage of riveting while the complete riveting of the box section structure occurs in the second, third and fourth riveting stages. As soon as the elements are moved to a riveting stage, the operation of the clamps, slides and riveting devices occur entirely automatically within a very short interval of time. The assembled chassis frames are supported on overhead conveyors which, when the frame is advanced over the units of a riveting stage, has a section which is moved downwardly to lower the assembled frame in position to be clamped. After the riveting operations are completed and the clamps released, the chassis frame is raised and advanced along the conveyor to the next riveting stage.

Accordingly, the main objects of our invention are to provide riveting devices which are advanced to engage the rivets of assembled chassis frame for thereafter swaging the rivets; to provide a chassis frame of box section construction and secure the elements thereof together by rivets; to provide openings in the web of some of the channel elements forming the box section structure, to permit the riveting devices to project thereinto; to provide devices in a riveting stage for riveting box section structures which clamps the assembled elements in position and aligns the elements relative to a rivet striker which advances a rivet adjacent to an aperture through which it is advanced and swaged by a riveting device; to provide control means for releasing the riveting device from the swaged rivet, for operating the slide to return the riveting device to its initial position and for thereafter releasing the clamps from the chassis assembly to permit the assembly to be removed from the units of the riveting stage.

A further object of our invention is to provide a central power unit which develops two stages of fluid pressure up for operating the various clamps and slides and for producing the swaging operation on the rivets.

A further object of our invention is to provide an electric and fluid control system operated by the fluid pressure built up after the operation of a device for producing the operation of the clamps, slides, and the riveting devices both before and after the swaging operation entirely automatically and also when desired to produce such operation in sequence through manipulation of a series of switches in predetermined order.

A still further object of our invention is to incorporate with the clamping and riveting devices the automatic application of rivets to the assembled chassis elements in a riveting stage.

Other objects and features of novelty of our invention will be either specifically pointed out or will become apparent when referring, for a better understanding of our invention to the following description taken in conjunction with the accompanying drawings, wherein:

Figure 1 is a plan view of the X member assembly disposed in the devices constituting the first riveting stage;

Fig. 2 is a plan view of the X member assembly;

Fig. 3 is a side view of the X member assembly, illustrated in Fig. 2;

Fig. 4 is an enlarged broken view of one-half of the front end portion of the riveting devices illustrated in Fig. 1;

Fig. 5 is an enlarged sectional view of the structure illustrated in Fig. 4, taken on the line 5—5 thereof;

Fig. 6 is an enlarged sectional view of the structure illustrated in Fig. 4, taken on the line 6—6 thereof;

Fig. 7 is an enlarged broken view of the central riveting portion of the riveting devices illustrated in Fig. 1;

Fig. 8 is an enlarged sectional view of the structure illustrated in Fig. 7, taken on the line 8—8 thereof with the riveting cylinder in advanced position;

Fig. 9 is a reduced view of the structure illustrated in Fig. 8 with the riveting cylinder in retracted position;

Fig. 12 is a side view of a complete chassis frame assembly disposed in position in the second riveting stage, with the position of the clamping, delivering and riveting units marked in dot and dash lines.

Fig. 13 is a plan view of the complete chassis frame assembly and certain units thereof as illustrated in Fig. 12;

Fig. 14 is a side view of the chassis frame assembly illustrated in Fig. 13;

Fig. 15 is an end view of a riveting device illustrated in Fig. 12;

Fig. 16 is a sectional view of the structure illustrated in Fig. 15, taken on the line 16—16 thereof, with the riveting device in advanced position;

Fig. 17 is a broken side view of the riveting device illustrated in Fig. 15;

Fig. 18 is a view of the rear unit illustrated in Fig. 12 for producing the riveting of the end cross member to the side chassis frames;

Fig. 19 is a side view of the structure illustrated in Fig. 18, with parts in section;

Fig. 20 is a side view, partly in section, of a positioning device for the side frame elements employed in the second riveting stage;

Fig. 21 is a sectional view of the structure illustrated in Fig. 20, taken on the line 21—21 thereof;

Fig. 22 is a side view of a clamp illustrated in Fig. 13 for securing the chassis frame assembly in position in the devices of the second riveting stage with the elements in clamping position;

Fig. 23 is a view of the structure illustrated in Fig. 22 with elements in unclamped position;

Fig. 24 is an enlarged sectional view of the structure illustrated in Fig. 22 taken on the line 24—24 thereof;

Fig. 25 is a side view of a rivet sorting and delivering device illustrated in Fig. 13;

Fig. 26 is an enlarged sectional view of the structure illustrated in Fig. 25, taken on the line 26—26 thereof;

Fig. 27 is a plan view of the chassis frame assembly disposed in the devices forming the third riveting stage;

Fig. 28 is an enlarged plan view of the chassis frame assembly illustrated in Fig. 27 showing the rivets which are to be swaged in the third riveting stage;

Fig. 29 is a side view of the structure illustrated in Fig. 28;

Fig. 30 is an enlarged broken plan view of the riveting device employed at the forward and rearward end of the frame assembly in the third riveting stage of Fig. 27;

Fig. 31 is an enlarged broken sectional view of the structure shown in Fig. 30, taken on the line 31—31 thereof;

Fig. 32 is an enlarged broken plan view of the structure employed at the central portion of the frame assembly in the third riveting stage illustrated in Fig. 27;

Fig. 33 is a side view of the structure illustrated in Fig. 32, as viewed from position 33 thereof;

Fig. 34 is an enlarged sectional view of the structure illustrated in Fig. 33, taken on the line 34—34 thereof;

Fig. 35 is an enlarged sectional view of the structure illustrated in Fig. 33, taken on the line 35—35 thereof;

Fig. 36 is an enlarged sectional view of the structure illustrated in Fig. 32, taken on the line 36—36 thereof;

Fig. 39 is a view in elevation of the fourth station showing the different types of riveting devices, with the rivets to be swaged and the position of the devices clearly indicated;

Fig. 40 is a plan view of the chassis frame assembly to be riveted in the fourth station, with the rivets to be operated upon shown as black dots.

Fig. 41 is a side view of the chassis frame illustrated in Fig. 40;

Fig. 42 is a rear view of one of the riveting devices employed at the front of the chassis frame assembly as illustrated in Fig. 39;

Fig. 43 is a sectional view of the structure illustrated in Fig. 44, taken on the line 43—43 thereof;

Fig. 45 is a sectional view of the structure illustrated in Fig. 46, taken on the line 45—45 thereof;

Fig. 46 is a side view of a riveting device illustrated in Fig. 39, as viewed from the line 46—46 of Fig. 45;

Fig. 47 is a sectional view of a further riveting device employed in the fourth stage as illustrated in Fig. 48, taken on the line 47—47 thereof;

Fig. 48 is a sectional view of the structure illustrated in Fig. 47, taken on the line 48—48 thereof;

Fig. 49 is a plan view of an entire assembly employed in combination with the riveting devices and the stations illustrated in detail in the foregoing figures;

Fig. 50 is an enlarged view, in side elevation, of a portion of the structure illustrated in Fig. 49 as viewed from the line 50—50 thereof, with the chassis frame assembly in raised position;

Fig. 51 is a view of structure, similar to that illustrated in Fig. 50, with the chassis frame assembly in lowered position;

Fig. 52 is a plan view of an accumulator system for developing and storing fluid employed for operating the fluid actuated elements of the devices illustrated in the foregoing figures;

Fig. 53 is an enlarged sectional view of one of the pressure accumulators illustrated in Fig. 52;

Fig. 54 is a view of a portion of a fluid system employed in conjunction with the devices in one of the stations, illustrated diagrammatically;

Fig. 55 is a view of additional fluid control elements to be employed in conjunction with those illustrated in Fig. 54 with the elements also shown diagrammatically;

Fig. 56 is a view of the control board for the electric circuits used in conjunction with the fluid system for interlocking the operation of the devices in a station;

Fig. 57 is an additional view of the fluid circuits and elements thereof illustrated diagrammatically to be employed in conjunction with the structure illustrated in Figs. 54 and 55 for controlling the operation of the devices of a station;

Fig. 58 is a view of a switch panel employed at each of the stations for control of the operation of the devices thereof selectively or automatically;

Fig. 59 is a view in elevation of the pilot control panel for operating the electric switches which interlock the electric and fluid system;

Fig. 60 is a schematic arrangement of the control elements at a station when automatic control is employed, and Fig. 61 is a schematic view of the control system employed for operating the device of a station under manual control.

Figure 10:
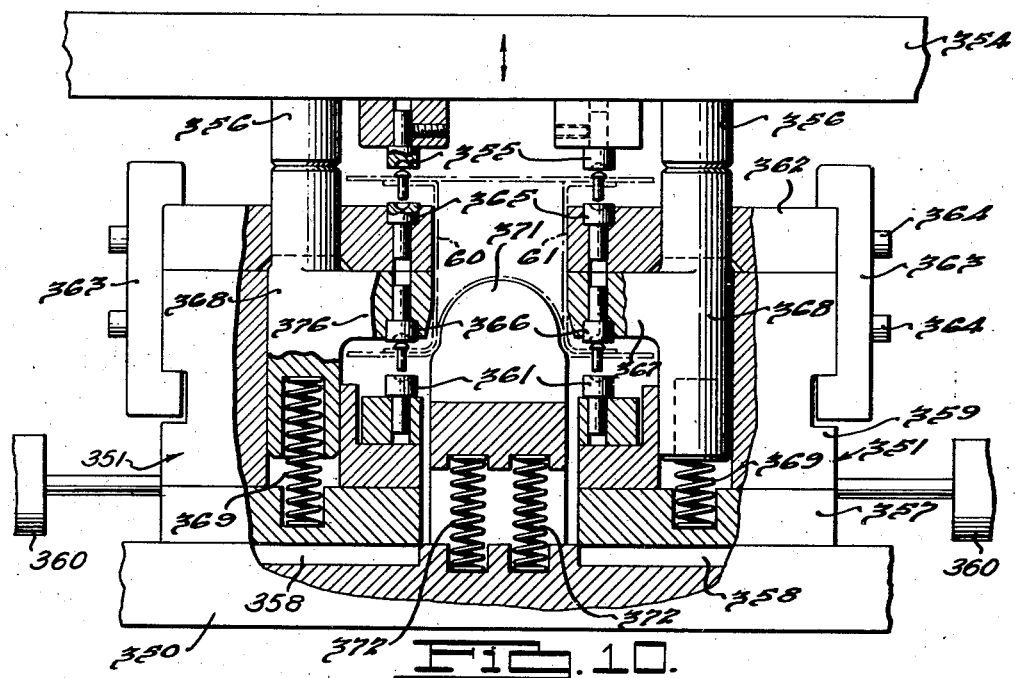
Fig. 10 is a view, partly in section and partly in elevation, of a device constituting an intermediate stage for riveting the propeller housing tunnel to the central portion of the X member assembly, with the riveting dies in open position.

A chassis frame, such as that to be riveted by the elements forming the operating stages of our invention, is constructed from various metal stampings. The frame illustrated embodies two side stampings 60 and 61 formed of outwardly presented channel section which are deflected inwardly at 62 and join to a central bracing element 63 to form an X member. Forwardly projecting leg portions 64 and rearwardly projecting leg portions 65 are shaped to mate with the chassis sill element and are jointed by cross members 66 and 67, respectively. The cross members 66 and 67 are secured to the side elements 60 and 61 by tongues which lock the cross members to the elements when rivets are disposed in the aligned openings thereof. This is clearly illustrated in the copending application of Otto Mueller, Serial No. 280,670, filed June 22, 1939, and assigned to the assignee of the present invention.

The rivets are inserted in the various aligned rivet holes of the assembled side elements, cross members, central bracing member 63, and also in a brace 68 which forms the rear support for the vehicle engine. The assembled elements of the chassis frame are then advanced to the first riveting station illustrated in Fig. 1, where it is lowered into the riveting devices thereof and the rivets, substantially thirty in number, are swaged to securely fasten the elements together.

The 15 rivets along each side of the frame indicated by the letter A, when swaged by the riveting device in station No. 1, secure the cross members 66 and 67 and the brace 68 along with the vertical flange 69 of the brace 63 to the side members 60 and 61. Similar backing and riveting devices 71 and 72 are employed at the forward and rear portion of the riveting machine of station No. 1, there being rivet backing fixtures 73 on the inner side of the frame which are actuated to move riveting dollys or heads 74 into engagement with the heads of the rivets. Thereafter, the riveting dies or heads 75 move toward the chassis frame to first provide a pressure between the webs of the elements 60 and 61 and the flanges of the cross members 66 and 67. Continued movement of the riveting heads 75 advances the dies into engagement with the rivet ends, and thereafter fluid under high pressure is applied to the head to swage the rivets to complete the riveting operation.

Referring to Fig. 4, the rivet backing fixtures 73 contain a slide 76 having a block 80 which engages a cam surface 77 on a pivoted arm 78 carrying the dollies or heads 74. The block 80 operating on the cam surface 77, forces the heads 74 outwardly against the rivet heads when the slide is actuated by a piston in a cylinder 79. A pivot 81 on the arm 78 is provided with an arm 82 which is biased by a spring 83 to retain the cam surface 77 against the block 80. Upon retraction of the piston of the cylinder 79 the slide is moved to the left, as viewed in the figure, permitting the arm 78 to be rotated by the spring 83 to move the heads 74 away from the rivets.

After the dollies 74 engage the rivets, pressure in the cylinder 79 builds up to a predetermined amount actuating a pressure switch which energizes the riveting device 75. Fluid is introduced through a conduit 84 to a stationary piston 85 and through an aperture 86 therein, to actuate a cylinder 87 toward the X-members 60 and 61. The head of the cylinder carries spring pressed plungers 88 which first engage the webs of the elements 60 and 61 and force them against the cross members 66 and 67. Riveting heads 89 are disposed adjacent to the plungers 88 in position to engage the ends of the rivets after the plungers engage said webs. After pressure builds up in the conduit 84 and within the cylinders 87, a differential valve is actuated to change from the low to a high pressure supply of fluid to the cylinder. The high pressure supply of fluid advances the cylinder and the riveting heads 89 to affect the swaging of the ends of the rivets which completes the riveting operation. A positioning pin 91 projects through an aperture 92 in the front cross member 66 to accurately position the assembled elements of the X member in station No. 1.

After the high pressure has built up in the cylinder 87, further relays are actuated to reverse the flow of fluid to the cylinder 87 to have the fluid flow therefrom through aperture 86 and conduit 84 upon the introduction of a low pressure fluid supply through a conduit 93 to the space between a shoulder 94 on the piston 75 and the cylinder head 95, as illustrated in Fig. 6. Upon the introduction of fluid into the cylinder 87 the head of the cylinder 95 functions, with the shoulder 94, as a buffer to prevent a shock occurring when rivets are omitted from the assembled elements or when operating the device without the assembled elements being in position. In this manner, the rivets indicated by the letter A at the front and rear of the assembled chassis elements are automatically swaged.

Disposed between the riveting devices 71 and 72 is a riveting device 96 embodying backing up devices 97 and 98 along with swaging devices 99, the former of which are disposed between elements 60 and 61 while the latter are disposed on the outside thereof, as illustrated in Fig. 1.

Referring to Fig. 7, the backing device 98 has a head 101, carried on a slide 102, actuated against the rivet head by a slide 103 operated from a piston in a cylinder 104. A dolly 105 for engaging and backing up an adjacent rivet head is carried on an element 106 mounted on a pivot 108 on a slide 107 which is actuated by a piston in a cylinder 109. A cam surface 111 is employed for forcing the element 106 toward the rivet when the piston in the cylinder is actuated to force the dolly 105 against the rivet head. Accordingly, through the actuation of the pistons 104 and 109 the rivets in the cross brace 98 are backed up by the backing heads or dollies 105.

A forwardly moving slide 112 carries a plurality of dollies 113 aligned with the rivets on the flanges 69 of the central brace 63 of the assembly. A downwardly moving slide 114, illustrated more clearly in Figs. 8 and 9, is provided with cam surfaces 115 and 116 which moves the slide 112 forwardly to have the dollies 113 engage and back up additional rivets in the frame. The slide is actuated by a piston 117 in a cylinder 118.

After the movement of the slide 112, pressure builds up in the cylinder 118 which operates a valve to introduce fluid under low pressure through the aperture 86 in the piston 85 to move the cylinder 87 forwardly to have the plunger 88 thereof press the elements to be riveted together and have the riveting dies 89 engage the ends of the rivets. After pressure builds up in the cylinder 87 a valve is actuated to introduce fluid under high pressure to the cylinder 87 to affect the swaging operation. The fluid under high pressure thereafter actuates a valve to introduce fluid under low pressure into the aperture 119 of the piston 85 and to divert the flow of fluid under high pressure to cause the cylinder head to be returned to its initial position. The accumulation of fluid pressure in the system thereafter operates a valve to effect a reverse flow of fluid in the cylinder 118 to return the cam slide 114 to its initial position. In Figure 9, the retracted position of the slide 112 and the cylinder 87 is illustrated.

It is to be understood that the actuation of the slide 112 occurs during the actuation of the slides 76 and those of the devices 97 and 98, so that all of the side rivets of the frame assembly are backed up at the same time. Similarly, all of the cylinders 87 carrying the riveting dies 70 or heads 99 are advanced simultaneously to produce the simultaneous swaging of the rivet ends. Preferably, the various elements forming the X members are assembled together with the rivets disposed in the various apertures and held therein by friction or by the application of rubber bands over pairs of rivets following the conventional practice.

The frame assembly is advanced into the riveting dies of station No. 1 where it is accurately positioned by the pin 91 which projects through an aperture in the front cross member 66. When in this position through the manual operation of a switch, the entire cycle of operation is initiated. The slides which operate the back up dollies are first moved through the introduction of pressure into the cylinders which moves the pistons to operate the slides. Upon the completion of the slide operation, pressure builds up in the system which operates a pressure valve to introduce fluid into the riveting cylinder which is advanced to first have the spring pressed plungers engage frame elements and force them into intimate relation, after which the riveting dies engage the rivet ends in position to perform the swaging operation.

Thereupon, pressure builds up in the system which operates a further valve to introduce fluid under high pressure into the cylinder 87 which affects the swaging of the rivet ends. A further valve is operated when the high pressure has built up in the system to divert the fluid under high pressure and introduce low pressure into the opposite side of the piston 85 to return the cylinder 87 to its initial position. Pressure thereafter builds up in the system to operate a further valve to reverse the flow of fluid in the slide cylinders to return the slides to their initial positions, returning the backing up dollies to their initial position clear of the frame.

The riveted frame assembly is then removed from the riveting device of station No. 1 and is advanced to an intermediate riveting machine which swages the rivets in the bracing element 63 indicated by the letter B in Fig. 2.

Figure 11:
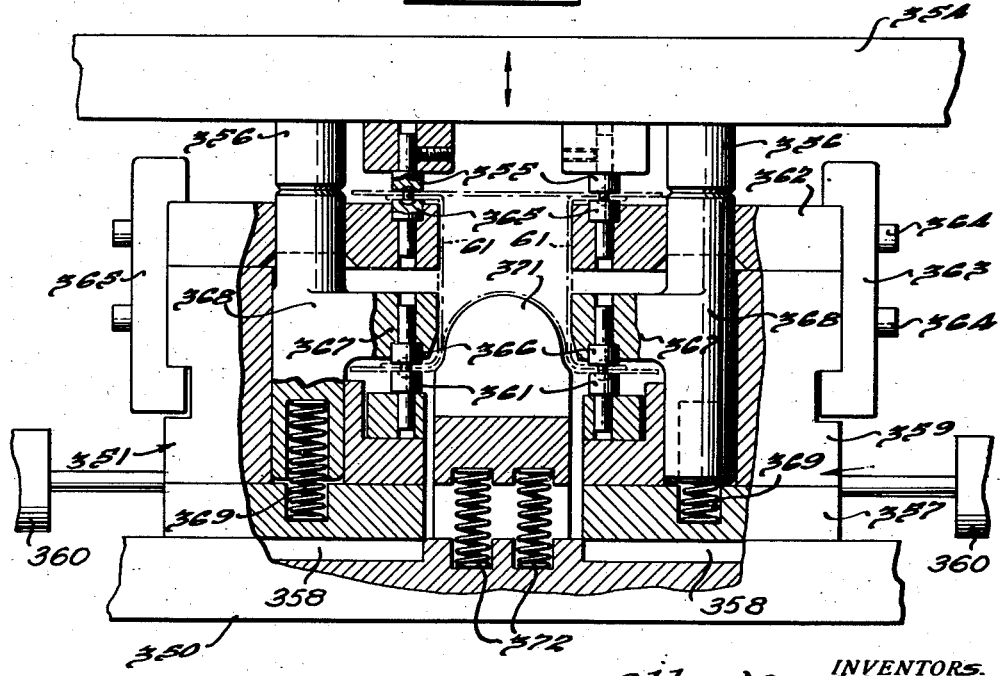
Fig. 11 is a view of the structure illustrated in Fig. 10, with the parts disposed in riveting position.

The riveting devices of the intermediate riveting machine are illustrated in Figs. 10 and 11. The machine embodies a base 350 having riveting heads 351 slidably mounted towards and away from each other by cylinders 360. Above the heads, a fluid pressure operated press 354 of the machine, which is of conventional form, carries riveting dollies 355 and stub shafts 356. Each head 351 comprises a base 357 operated in slides 358 to a position to engage the chassis frame elements 60 and 61. In the figures, the heads 351 are illustrated as having been moved into engagement with the chassis frame elements. A body portion 359 of the heads carries riveting dies 361 aligned with the dollies 355 on the press 354. Upon the body 359 a plate 362 is secured by clamps 363 retained by bolts 364. Riveting heads 365 carried by the plate 362 are aligned with the dollies 355 and dies 361. Additional aligned dollies 366 are mounted on projecting arms 367 of plungers 368 which are guided in the plate 362 and body 359 and urged upwardly by springs 369.

Centrally of the base 350 a chassis assembly supporting element 371 is mounted for vertical movement on springs 372. After the chassis frame assembly has been riveted in station No. 1 it is moved into the intermediate riveting machine to rest upon the supporting element 371 thereof. It is to be understood that the press 354 has been raised and that the riveting heads 351 have been moved outwardly from the element 371 a sufficient amount to permit the frame assembly to be inserted thereon.

Thereafter, the riveting heads 351 are moved into the position illustrated in Figs. 10 and 11, after which the press 354 is moved downwardly to have the stub shafts engage the plungers 361 as illustrated in Fig. 10. With the continued movement of the press 354 the dollies 355 and 366 are moved into engagement with the heads of the rivets and the rivets and the chassis assembly are moved downwardly with the element 371 against the bias of the springs 369 and 372 for swaging the rivets in the fixed dies 361 and 365, as illustrated in Fig. 11. Thereupon pressure in the system operates a valve to reverse the flow of fluid to the press 354 to return it to its initial position after which the pressure built up in the system, operates a further valve to reverse the movement of the riveting heads 351 to move them outwardly clear of the chassis frame assembly which then may be moved out of the intermediate riveting machine.

Referring again to the X member side elements 60 and 61 it will be noted that the webs of these elements are struck inwardly at 121 to provide a ledge for the projections on the flange 69 of the bracing element 63. These struck in portions 121 are restruck in the first riveting stage by the die 122 carried on the cylinder 87 as illustrated more clearly in Figs. 7 and 8. In the final swaging movement of the cylinder 87, the die 122 restrikes the portions 121 to have the projections 123 on the flange 69 mate with the portions 121 and to be in position to receive the rivets which will be swaged in the third riveting stage.

When the X frame assembly is removed from the intermediate riveting machine, it is advanced on the conveyor 308 of Fig. 49 where the side chassis sill elements 124 and the braces 125 are added thereto and all of the rivets are stuck in the mating apertures except those to be stuck upwardly along the bottom of the frame. The assembly is then supported on a pair of hangers 311, as illustrated in Figs. 50 and 51, one being clamped to each of the cross members 66 and 67. The hangers are suspended on wheels from an over-head conveyor 309 and the chassis frame assembly is suspended in a horizontal position to be advanced from one stage to another until the operations are completed.

When positioned over stages 2, 3, and 4, the conveyor is so constructed that that portion of the track 312 supporting the hangers over the riveting stages is suspended on a fluid ram 314 which lowers and raises the track at the will of the operator. This conveyor system having raising and lowering devices is illustrated and described in the patent to H. G. Westmore, No. 1,459,456, issued June 19, 1923, and under which the present assignee is a licensee.

Referring to Fig. 14, the bottom rivets marked C on both sides of the frame are inserted from the top with the head up as illustrated in Fig. 19. The remainder of the rivets, 13 in number, are marked D, and these are automatically stuck from the bottom after being delivered by the rivet sticker illustrated in Figs. 25 and 26. The rivet sticker automatically sorts and delivers rivets to the aligned openings in the frame from which they are moved through the openings into riveting position by the riveting device.

When the chassis frame assembly is lowered into the riveting devices, as illustrated in Fig. 12, a plurality of clamps 126 are automatically actuated to accurately position the assembly relative to the devices of the second riveting station, as illustrated in Figs. 22, 23, and 24. Each clamp is hydraulically actuated by a cylinder 127 operating a piston rod 128 which operates a bell crank 129. The bell crank is supported on a pivot 131 and operates through a link 132, a bell crank 133 having a jaw 134. A slide 135 has a clamping face 136 which is moved forwardly to engage the web of the side chassis sill elements 124 when engaged by the roller 137 on the bell crank 129. A spring 138 is compressed during this forward movement and functions to move the slide 135 away from the web when the chassis frame assembly is released by the clamp. A plurality of the clamps accurately position and lock the assembled elements in station No. 2.

A plurality of additional clamping elements 139 may be provided in station No. 2 for the purpose of positioning the flange 141 on the X member elements 60 and 61 relative to the flange 142 on the side chassis elements 124 as illustrated more clearly in Fig. 20. The rivets 143 retain the top flanges of the elements 60 and 124 aligned and the clamp 139 accurately positions the bottom flange to have the aperture thereof accurately aligned so that rivets can automatically be stuck therethrough. The clamping element 139 embodies a pair of slides 140 and 150 interconnected by a cylinder 143 and piston rod 144. A spring 145 is disposed between the slide 141 and a projection 146. The slide 150 carries a stub shaft 147 on the end of which a head 148 is secured.

A body 149 is carried on the stub shaft 147 for axial movement thereon, having a lower projection 151 on the bottom of which an arm 152 is provided aligned with an arm 153 carried on the slide 140. The arm 153 has an adjustable stud 154 thereon by which adjustment between the two slides may be accurately obtained. A plurality of fingers 155 are carried on a cylinder 156, secured by bolts 157 on a collar 158 on the stub shaft 147. A spring 159 is provided between the collar 158 and the cylinder 156 to advance the cylinder until the head of the bolts 157 abut against the collar 158. The collar also supports a plurality of fingers 161, the ends of which engage the webs of the chassis members 60 and 61. Positioning elements 162 are provided on the slide 140 for engaging the web and flanges of the chassis sill elements 124.

When the cylinder 143 has fluid under pressure introduced therein, the piston 144 is drawn inwardly to first move the slide 150 to move the forward end of the stub shaft 147, the head 148, the body 149, and the fingers 155 through an opening 163 in the web of the elements 60 and 61. The forward position of the body 149 permits the fingers 155 to be swung inwardly toward the axis of the stub shaft 147 by springs 164. The forward movement of the slide 150 is arrested by the stop element 165 provided on the projection 146. Thereupon the slide 140 moves forwardly, the sequential movement being assured by the presence of the spring 145.

The forward movement of the slide 140 causes the stud 154 to engage the projection 152 to thereby move the elements 151 and 149 to the right, as viewed in the figure, permitting the cam surfaces 166 to actuate the fingers 155 outwardly into engagement with the inner surface of the webs of the elements 60 and 61. The continued movement of the slide 140 moves the fingers and therefore the elements 60 and 61 therewith into abutting relation with the ends of the rods 161. The cylinder 156 moves along with the slide 140 until the positioning elements 162 engage the chassis sill element 124 and the projection 153 strikes against the stop element 167 on the projection 146. In this manner, the webs of the X-member elements 60 and 61 may be accurately spaced relative to the webs of the chassis sill elements 124 and the holes in the flanges thereof, through which the rivets marked D in Fig. 14 are to be inserted, and accurately aligned.

Referring to Figs. 25 and 26, the rivet sticker embodies a hopper 168 in which a plurality of rivets are tumbled as the hopper is rotated. The rivets are delivered to a slide 169 which is slotted to have the rivet ends project therethrough when supported by their heads. A rivet is delivered from the end 171 of the slide to a rivet holder 172 from which it is advanced by a plunger 173 when fluid pressure is admitted to the cylinder 174. The rivet in the holder 172 is forced into an aperture 175 in a pair of spring pressed jaws 176 which receive and hold the rivet. A conical surface 177 is provided about the opening 175, larger than the diameter of the head, so that pressure on the head will force the jaws 176 to open and permit the rivet to pass therethrough. The jaws 176 are carried on a cylinder 178 having a projection 179 on the side wall which operates in a helical slot 181 to turn the jaws 176 through 180 degrees. This changes the position of the head of the rivet from the top of the jaws as received, to the bottom when the rivet is projected forwardly and aligned with the apertures of the flanges 141 and 142. Such a rivet sorting and advancing device has been illustrated, described and claimed in the copending application of Otto Mueller, Serial No. 280-670, filed June 22, 1939, and assigned to the assignee of the present invention. A rivet is projected forwardly during each operation into alignment with the apertures in the lower flanges through which it is advanced by a riveting device when it is advanced to riveting position. A rivet sticker is employed for each of the rivets marked D and the riveting devices are disposed between the rivet stickers in a position to effect the swagging operation when advanced. The plunger of the riveting device when actuated first forces the rivet from the jaws 176 through the aperture, after which the riveting die is moved to engage and thereafter engage the rivet end.

As illustrated in Figs. 15, 16, and 17, the riveting devices 182 embody a C-shaped element 183 clamped in a frame 184 provided with bearings 185 which project over a stub shaft 186. The stub shaft 186 projects from the slide 187 which is operated to and from the frame in ways 188. A cylinder 189 operates a piston rod 191 which is pivoted to the slide 187 by a pivot 192. A plurality of springs 193 are disposed between the slide 187 and the frame 184 for biasing the frame and the riveting device carried therewith upwardly on the stub shaft 186. A stud 194 projects from the bottom of the frame 184 through a bearing 190 in the slide against which a head on the end of the stud abuts to limit upward movement of the frame. A riveting dolly or backing head 195 is carried on one end of the C-shaped element 183 while a cylinder 196 is attached to the opposite end. The cylinder encompasses a piston 197 which operates a plunger 198 on the end of which a riveting die or head 199 is mounted, aligned with the dolley 195. This device 182 is employed to swage the rivets along the bottom flanges of the assembly.

Adjacent to the backing up head 195 a positioning element 201 is secured to the frame 184 for the purpose of positioning the X member elements 60 and 61 relative to the backing dolley 195. It will be noted that the end of the C-shaped element 183 containing the dolley or backing up head 195 is of arcuate shape so as to be projectable within the circular apertures 202 provided in the webs of the chassis element 60 and 61.

In Figs. 18 and 19, we have illustrated a different mounting for the riveting device 182, that wherein a bracket 203 for supporting the C-shaped element of the device, is mounted on a pivot 204 to swing the riveting device 182 thereabout when a cylinder 205 receives a fluid to operate a piston rod 206. The bracket 203 is mounted on a stub shaft 186 and is moved on the stub shaft by a piston rod 207 by fluid introduced into a cylinder 208. The upward movement of the bracket on the stub shaft is limited by the stud 194 and is assisted by the spring 193 disposed between the arcuate swinging slide 209, which supports the stub shaft 186, and the bracket 203. This riveting device 211 is employed at the same end of the chassis assembly as the device 182, to rivet the cross brace 212 to the bottom flange of the chassis frame side sill 124. It will be noted in Fig. 19, that the casting 183 is cut away at 213 to clear the brace 212 and is provided with a recess 214 at the top to clear the rivet 215 which is stuck in the frame but not swaged.

After the assembled chassis frame elements are disposed in the devices of station No. 2 the actuation of a valve first builds up pressure on the clamps 126 which clamp the chassis frame side sills 124 in predetermined position relative to the devices. As pressure builds up after the clamping operation, a valve is actuated to introduce fluid pressure into the cylinder of the positioning devices 139, to the rivet stickers 168 and into the cylinders which operate the slides of the riveting devices. The rivet stickers advance a rivet, with the head down, in aligned relation with the apertures in the flanges 141 and 142 which have been accurately positioned by the positioning device 139. At the same time the riveting device 183 will be moved into riveting position aligned with the rivets marked D of Fig. 14. At the end of the advance movement of the riveting device into aligned relation with the rivets, pressure building up in the fluid system, actuates a valve to introduce fluid under low pressure into the cylinder 196 of the riveting devices. This advances the pistons 197 to engage the rivets in the jaws 176 of the rivet sticker, and advances the rivet therefrom into the apertures in the flanges 141 and 142.

As pressure builds up in the system providing low pressure to the cylinder 196, a valve is operated to introduce high pressure into the cylinders to force the head 199 of the device 183 toward the dollies 195 to thereby swage the rivets against the flanges. After the swaging operation the building up of the high pressure in the system operates a valve to cut off the high pressure and introduce low pressure on the oppoite side of the piston 197 to retract the piston rod 198 and the riveting die 199. After the piston returns to initial position pressure again builds up in the system to operate further valves to return the positioning device 139, the rivet sticker, the slides 187 and the casting 209 to their original positions after which pressure building up in the system to operate another valve to reverse the flow of pressure to the cylinders of the clamps to release the clamps to thereby free the assembled elements from the devices of station No. 2.

It will be noted in this construction that the initial movement of the piston rod 198 moves the riveting head 199 against the rivet and that further pressure draws the yoke 183 downwardly to move the bracket 184 against the pressure of the springs 193. After the dolly or backing up head 195 engages the end of the rivet the pressure not being sufficient to effect the swaging operation will build up and operate valves to introduce fluid under high pressure to the cylinder 196. The high pressure further actuates the yoke 183 and its supporting bracket 184 downwardly against tension of the springs 193 to effect the swaging operation through downward movement of the dolly 195 against the riveting head 199. While it is usual to produce the riveting operation by the movement of the riveting head 199, in this instance, in view of the rivets being stuck upwardly from the bottom, it is necessary that the head 195, which is usually the dolly or back up head, produces the swaging of the rivet end through the bodily movement of the yoke 183 of the device. The stud 194 is effective after the pressure is removed from the device 182 to limit the upward travel of the yoke 183, and is also available to prevent the device 182 from swinging angularly about the stub shaft 186.

In the riveting device 211, as illustrated in Figs. 18 and 19, the cylinder 208 is energized, after the slide 209 is swung to have the end of the yoke 193 projected over the rivet, to move the yoke downwardly against the springs 193 to have the head 195 thereof engage the head of the rivet. Thereafter, movement of the piston rod 198 moves the riveting head 199 against the projecting rivet end which is then swaged. As pointed out hereinabove, the rivets, joining the flange 142 of the side chassis sill member 124 to the cross brace 212, were previously stuck downwardly so that the heads are above the flange while the portion of the rivet to be swaged projects therebelow. The cylinder 208 is relied upon to draw the top end of the yoke downwardly before the rivet end is swaged by movement of the piston rod 198 upwardly.

Figure 37:
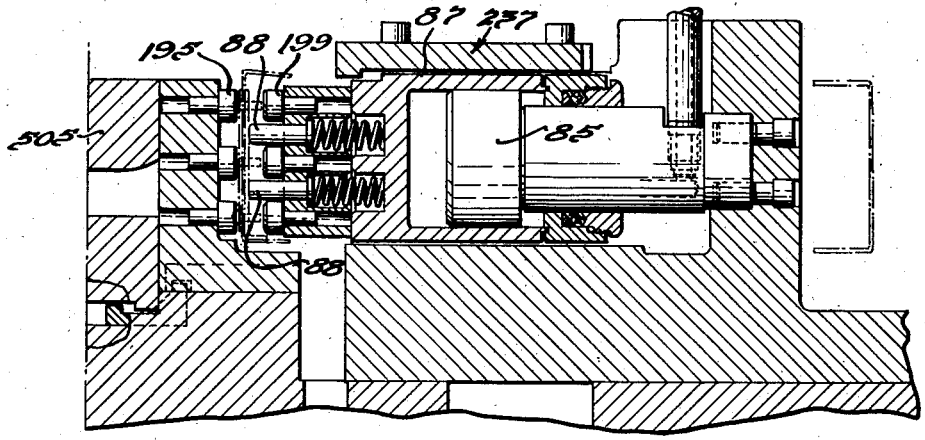
Fig. 37 is an enlarged sectional view of the structure illustrated in Fig. 32, taken on the line 37—37 thereof.

Upon the completion of the riveting operation the lowered track portion of the conveyor system is raised to raise the chassis frame from the devices of station No. 2 after which it is advanced over station No. 3 at which station a section of the track of the conveyor system is lowered to lower the frame within the riveting devices forming the third station. This is illustrated in Fig. 27. Eighteen rivets are swaged in station No. 3, nine at each side of the center line of the chassis frame. The braces 125 each have five rivets which are to be swaged, three joining the flange of the brace to the web of the elements 60 and 61, as illustrated in Fig. 37, and two rivets joining the outer flange of the brace 125 to the web of the chassis sill elements 124, as illustrated in Fig. 29. Vertically disposed rivets joining the flanges of the cross braces 66 and 67 with the projecting flange portion 216 at the front and rear portion of the side chassis elements 124 are also swaged in this station.

A device 217, which is similar to device 211 with the exception that the stub shaft 186 is mounted on a reciprocable slide 184 instead of the swinging silde 209, swages the rivets of the cross braces 66 and 67 to the flanges of the chassis sill elements 124. When the frame is clamped relative to the devices of station No. 3 illustrated in Fig. 27, with the clamp disposed on the lines designated as 218, the slides 184 are actuated upon the introduction of fluid into the cylinders 189 to move the yokes 183 into riveting position. Thereupon the cylinders 208 are energized to move the yokes downwardly to have the dollies 195 engage the rivet heads after which fluid is introduced to the cylinders 196 to force the plungers 198 upwardly to have the riveting head 199 swage the end of the rivet. In this manner, the two rivets at each end of each of the side walls 124, marked E, are swaged to rigidly clamp the ends of the braces 66 and 67 to the projections 216 thereof.

The riveting device employed for riveting braces 125 to the chassis side elements 124 are illustrated in Figs. 32 to 38 inclusive. The rivets in Fig. 29, marked F, join the elements 125 to the sill elements 124 and are backed up by a pair of dollies or riveting heads 195 carried by a slide 219. The slide 219 is actuated toward the rivets by a downwardly movable cam 221 actuated by a piston rod 222 actuated by a piston in a cylinder 223. The slide 219 is provided with a sloping surface 224 which is engaged by sloping surface 225 carried by the cam 221. Through the introduction of fluid into the cylinder 223, the piston rod 222 is moved downwardly, moving the cam 221 therewith and producing the lateral movement of the slide 219 through the engagement of the sloping surface 225 of the former with the sloping surface 224 of the latter. This movement occurs against the bias of a spring 226 which returns the slide 219 to its initial position when the cam 221 is moved upwardly when the flow of fluid in the cylinder 223 is reversed.

After the rivets F are backed up in this manner, fluid is introduced into a cylinder 227 of the riveting devices through a conduit 228 which moves a piston 229 toward the chassis frame. This forward movement advances a piston rod 231 against a slide 232 which carries riveting heads 199. Within the slide 232 a material engaging element 234 is mounted, biased ahead of the riveting heads 199 by a spring 235. Upon the initial movement of the piston 229 and piston rod 231, the resulting movement of the slide, causes the material engaging element 234 to provide a predetermined pressure between the web of the chassis frame elements 124 and the flange of the braces 125 as the continued movement of the slide causes the heads 199 to engage the ends of the rivets F. Thereupon pressure builds up in the circuit to operate the high pressure valve to introduce fluid under high pressure to the cylinders 227 to effect the swaging operation by the further movement of the slide 232 toward the elements to be riveted together. The forward movement further compresses a spring 226 which returns the slide 232 to its initial position when the piston 229 is retracted.

For riveting the three rivets marked G in Fig. 28, backing up dollies 236 are employed for backing up the rivets while a riveting device 237 effects the swaging operation. The dolly 236 embodies a slide 238 operated in ways 239 toward and from the rivets. The slide carries a backing up head 195 which engages the heads of the rivets when the slide is actuated toward the rivets by a cam plate 505 operated by a piston in a cylinder 506.

Figure 38:
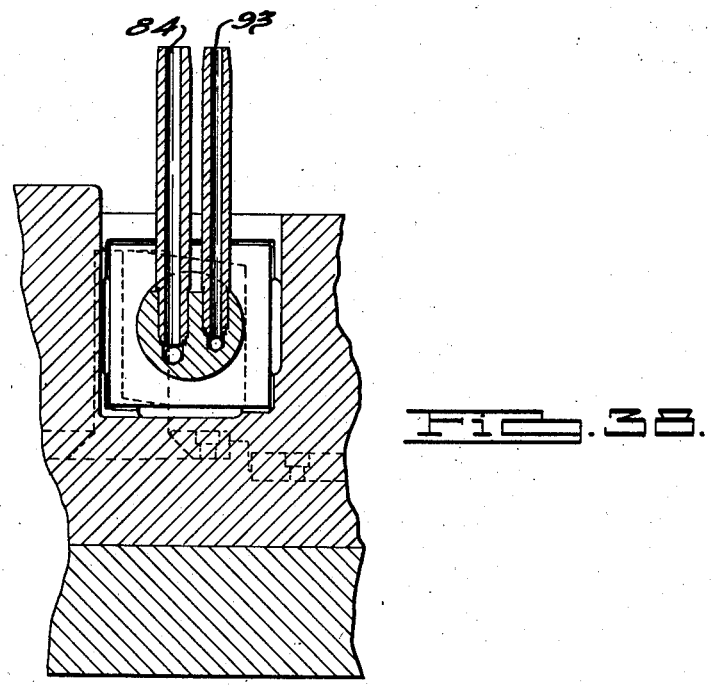
Fig. 38 is an enlarged sectional view of the structure illustrated in Fig. 32, taken on the line 38—38 thereof.

The riveting device 237, illustrated in section in Figs. 37 and 38, is similar to the device of station No. 1 and embodies a cylinder 87 operating on a piston 85 when fluid is introduced into the cylinder through conduits 84 and 93. The cylinder is provided with a pair of spring pressed plungers 88 for clamping the work together while a plurality of riveting heads 199, herein illustrated as three in number, are employed for contacting the ends of the rivets. The operation of the cylinder 87 occurs in the same manner as that of the cylinder illustrated in the riveting device of Fig. 8. Upon the completion of the movement of the backing up slide 238, pressure builds up in the system to operate a valve to introduce fluid under low pressure into the cylinder head of the piston to move the cylinder 87 to have plungers 88 engage and apply a pressure to the material to be riveted together and thereafter the riveting head 199 engage the ends of the rivets. Thereupon pressure builds up in the system which operates a high pressure valve to introduce fluid under high pressure ahead of the piston 85 to further move the cylinder 87 to affect the swaging operation.

Particular attention is directed to the fact that the slide 232 and the riveting device 237 are mounted on a slide 500 which is supported by ways 240. The slide 500 is advanced to the left as viewed in Fig. 32 by a cam 501 which is operated downwardly by a piston in a cylinder 502 as illustrated in Fig. 36. The movement of the slide 500 to the left moves the backing elements 219 under the flanges of the brace 125 in a position to have the dollies 195 engage the heads of the rivets F when the dollies are advanced toward the chassis sill element 124. Similarly the riveting head 199 on the riveting device 237 is moved under the flange of the brace 125 in a position to engage the rivet when the head 199 is advanced to engage and swage the end. A plunger 503 engages the left hand edge of the slide 500 and compresses a spring within the cylinder 504 when moved to the left by the slide 500. The tension of the spring is available thereafter to return the slide 500 to the right after the cam 501 is moved upwardly by the piston in the cylinder 502. The piston rod 231 merely abuts against the slide 232 and is entirely disconnected therefrom to permit the slide 500 to move relative thereto. It will thus be seen that the slide 500 is first actuated to move the backing up element 219 and the riveting device 237 in alignment with the rivets before the rivets are backed up and thereafter engaged by the riveting heads and swaged by a further movement of the heads. The backing up element 219 and riveting device 237 are first moved away from the rivets after which the cam 501 is raised and the spring in the cylinder 504 moves the plunger 503 and therefore the slide 500 to the right to its initial position to have the elements and devices move out of the confines of the brace 125.

It is to be understood that in the third stage the clamps are first actuated to clamp the frame in predetermined position relative to the devices after which the slide 500 is moved to the left and the backing up elements are moved to engage the rivets. Thereafter the riveting devices are actuated to engage the rivets and thereafter affect the swaging operation. All the devices are, therefore, actuated simultaneously and in sequence and a very short period of time is required to produce swaging of the rivets E, F and G on the frame as illustrated in Figs. 27 to 29. Upon completion of the swaging operation the lowered portion of the track is raised along with the hangers and frame which may then be advanced to the fourth riveting station where the top rivets of the frame are swaged.

When the frame is advanced to the fourth riveting station a valve is operated to lower a section of the track of the conveyor system which lowers the frame into the devices of the station. A plurality of clamps 126 are first operated to lock the frame in predetermined position relative to the devices. Thereafter slides carrying the riveting devices are operated to have the backing up and riveting heads thereof move into aligned relation with the rivets, after which the swaging of the rivets occurs.

The downwardly stuck rivets in the top flanges of the X members 60 and 61 and in the side chassis sill elements 124, along with the rivets joining the braces thereto indicated in solid black in Figs. 39, 40 and 41, are swaged in the fourth riveting station. The riveting devices for swaging the rivets marked I in Fig. 39 are illustrated and described relative to Figs. 15, 16, and 17, with the exception that the yokes 183 are inverted to have the riveting cylinders 196 disposed at the top instead of the bottom of the devices. Otherwise, the riveting devices function in the same manner as herein above described for riveting the bottom instead of the top rivets.

Figure 44:
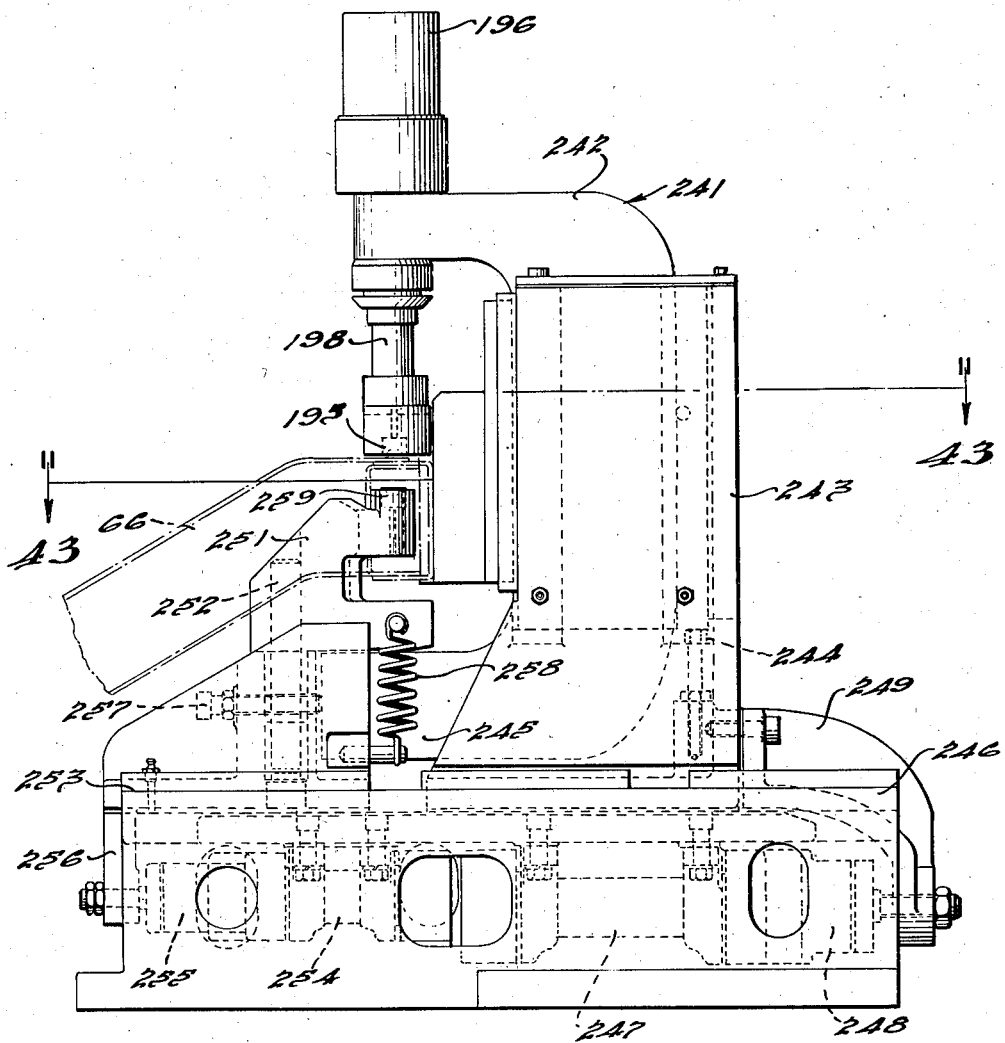
Fig. 44 is a side view of the structure illustrated in Fig. 42, as viewed from the line 44—44 thereof.

Riveting units 241 are employed for swaging the rivets joining the cross members 66 and 67 to the top flange which are indicated by the letter J in Fig. 41. The unit 241 is illustrated in detail in Figs. 42, 43 and 44 wherein a yoke 242 is supported by a bracket 243. The yoke is vertically movable, its lowermost position being adjustable through its engagement with the head of a stud 244. The upper end of the yoke supports the cylinder 196, piston rod 198, the head 195 while its lower end terminates in a rectangular projection 245. The bracket 243 is supported in ways 246 to be slidable thereon when actuated through the admission of fluid under pressure to a cylinder 247 operating through a piston rod 248 and a bracket 249. A second yoke 251 is carried on a stub shaft 252 in the guideways 253 for movement toward and from the yoke. A cylinder 254 operates a piston rod 255 connected to a downwardly extending portion 256 of the yoke 251. An adjustable stud 257 positions the yoke 251 relative to the yoke 242. A pair of springs 258 are secured between the yoke 251 and the support therefore which biases the yoke downwardly on the stub shaft 252.

After the frame has been inserted in the devices of station No. 4, and clamped therein by the clamps 126, the cylinders 247 and 254 are energized to move the yokes 242 and 251 toward each other to encompass the frame. This aligns the head 259 of the yoke 251 with the rivet and the head 195 of the yoke 251. After pressure is built up in the fluid system thereafter, fluid is introduced into the cylinder 196 to move the head 195 into contact with the rivet head which thereafter moves the yoke 242 upwardly carrying the yoke 251 therewith to have the head 259 engage the end of the rivet. Thereafter, fluid under high pressure is introduced into the cylinder 196 to further move the yoke 242 and the yoke 251 upwardly to have the head 259 affect the swaging operation. It will be noted in this arrangement that the head 195 is actually the backing up head while the head 259 produces the swaging of the rivet end which it engages.

After the swaging operation, fluid under low pressure is introduced into cylinder 196 to return the piston rod 198 to its initial position which permits the springs 258 to move the yoke 251 and yoke 242 downwardly to their initial positions. Thereafter the fluid is reversed in the cylinders 247 and 254 causing the yokes to move away from each other to their initial positions clear of the chassis frame.

It will be noted that the riveting device 241 for swaging the rivets at the rear cross member 61 is tilted relative to the vertical which is effected by tilting the guideways 246 and 253 relative to the base. The degree of tilt conforms to the slope of the chassis frame "kick up" portion to have the riveting occur normal to the flanges thereof.

Devices 261 for riveting the top rivets to the top of the brace 125 to the web of the side sill elements 124, indicated by letter H, are illustrated in Figs. 45 and 46. The devices are somewhat similar to that illustrated in Figs. 42, 43 and 44 in that the riveting mechanism 262 embodies a yoke 263 supported on a bracket 264 in which the yoke is vertically movable. The bracket 264 is supported on hub 265 which is pivoted on the shaft 266 supported on a slide 267. The slide operates in ways 269 on a base 271. A cylinder 272 has its one end pivoted to the base 271 while the other end is pivoted to an arm 273 projecting from the slide 267. Upon the introduction of fluid under pressure to the cylinder 272 the slide is moved to and from the frame to align the head 195 with the rivet and move it therefrom after the swaging operation. A yoke 274 is mounted on a slide 275 in ways 276, which slide is actuated by a piston 277 operating in a cylinder 278. The yoke is moved into a position to have the head 252 in alignment with the rivet end and have a projection 279 extend over the lower projecting end 281 of the yoke 263. The projection 279 has a pair of studs 282 on which compression springs 283 are mounted to bias the projection 279 of the yoke 274 downwardly. The rods extend through apertures in arms 284 against which the spring is compressed. The yoke 274 is moveable vertically on a stub shaft 252 supported on the slide 275.

Fluid is introduced into the cylinders 278 and 272 simultaneously to have both slides move toward each other. This moves the yoke 274 and the riveting cylinders 262 in alignment with the rivet after which the pressure in the cylinder moves the heads 195 and 252 into engagement with the rivet and tensions the springs through the upward movement of the bracket 264, yoke 263 and yoke 274. Thereafter, fluid under high pressure is introduced into the cylinder 262 to produce the swaging operation through the further movement of the yoke 263 and yoke 274 which moves upwardly therewith because of the extension of the yoke portion 279 over the end 281 of the yoke 263.

After the swaging operation, the springs 283 draw the yokes 263 and 274 to their initial position after the reversal of the flow of fluid to the cylinder 196. Thereafter, the flow of fluid is reversed in the cylinders 278 and 272 and the slides 271 and 275 are moved away from each other to their initial positions to have the heads 195 and 252 clear the chassis frame.

A further type of riveting device 286 is illustrated for riveting the pairs of rivets marked K in Fig. 40, which device is illustrated in detail in Figs. 47 and 48. The device 286 is disposed on the inside of the frame while the other riveting devices of the station are mounted so as to be positioned exteriorly of the frame. A yoke 287, having an upwardly sloping projecting end 288 supports a head 289. A pair of the yokes 287 are mounted on a stub shaft 186 for movement axially thereof. A bracket 290 for supporting the yokes 287 on the stub shaft 186, has on the lower end 291 a rod 292 on which a compression spring 293 is mounted to be compressed between nuts 294 on the end of the rod and the undersurface of a slide 295. The slide supports the stub shaft 186 and an adjustable stud 296 which limits the downward movement of the bracket 289 on the shaft 186. The slide 295 is mounted in angularly disposed ways 297 and is operated by a piston rod 298 from a cylinder 299. By having the slide 285 disposed in ways 297 which are mounted at an angle, the end 288 of the yoke 287 disposed on the same slope may be moved through an opening 163 in the X members 60 and 61 and have the head 289 disposed adjacent to the end of the rivet. A cylinder 196 is mounted on the yoke 287 for operating the plunger 198 and the head 195 thereon.

When fluid is introduced into the cylinders 196 under low pressure the plungers 198 move downwardly to have the heads 195 engage the tops of the rivets with a predetermined force regulated by the tension of the spring 293 which forces the top flange against the adjacent lower flange. Thereafter, the yokes move upwardly to have the heads 289 contact the ends of the rivets. As pressure builds up in the system, a valve is operated to introduce fluid under high pressure to the cylinders 196 to cause further upward movement of the yokes 287 to thereby swage the ends of the rivets. After the high pressure building up in the system another valve is operated to relieve the high pressure and introduce low pressure on the opposite side of the piston to return the head 195 to its retracted position and the yokes will be returned to their lowered position by the springs 293. Pressure will then build up in the system and operate a valve to reverse the flow of fluid to the cylinder 299 to operate the slide 295 in a reverse direction to move the riveting device 286 away from the chassis frame assembly. It is to be understood that all of the slides for the various riveting devices are operated simultaneously as are the plungers of the riveting devices to first engage the rivets and thereafter affect the swaging operations.

While the description of the devices and the operations performed in the various stations have been made on individual devices and as applied to one side of the chassis frame assembly, it is to be understood that similar riveting devices are employed on both sides of the longitudinal center line of the chassis frame and that the devices described for one side thereof applies exactly to the opposite side thereof. It will be further noted that the complete disposition of all elements of each stage are likewise not illustrated since it is believed that this would be confusing rather than clarifying. The various types of devices employed for the rivets of different location have been illustrated and described in detail and these will naturally be assembled adjacent to those rivets for which the particular device has been developed. It is further understood that the particular chassis frame illustrated, with the various braces and location of rivets, has been shown more for the purpose of illustration, since it is well known in the art that various shapes of chassis frames are employed for different automobiles and various bracing methods are employed for forming the assembly and the support for the engine. It is therefore to be understood that for such variations in shapes of stampings and location of rivets that a different disposition of the riveting device will naturally occur in the various riveting stations. Similarly the omission of certain of the bracing and supporting elements will result in the omission of rivets and therefore of the riveting devices illustrated at the various stations.

Referring to Fig. 49, I have illustrated diagrammatically the assembly line employed with the devices of the four mentioned and intermediate stations. The side chassis frame elements 60 and 61, the cross braces 66, 67, and 68 along with the bracing elements 63 and 69 are assembled on a table 305 where they are advanced by a belt, or manually, and the rivets inserted in the various aligned apertures certain of which retain the cross braces 66 and 67 in unit relation with the side elements through the tongue and slot connection referred to hereinabove. The assembled elements are moved into station No. 1 where the various devices are actuated to produce the swaging of the 15 rivets along each side of the assembly. Thereafter the assembly is moved into the intermediate machine 306 heretofore referred to as the intermediate station, where the 14 vertical rivets joining the element 63 to the side elements 60 and 61 are swaged. Altogether 44 rivets are swaged in the first and intermediate stations.

After the assembly is moved from the machine 306 it is passed laterally on a conveyor 307 to a conveyor 308 operating parallel to the table 305 in the opposite direction. The side chassis elements 124 and the additional braces 125 and 212 are added to the X member assembly as it passes along the conveyor 308.

It will be noted that braces 301 have been riveted to the side sill elements 124, the end engaging the cross members 60 and 61 to be riveted in the fourth riveting station. At this point 36 top rivets are inserted in the top mated flanges of the assembly which are to be swaged in station No. 4 while 18 rivets are disposed in the side and bottom to be riveted in station No. 3 along with four rivets which are inserted downwardly through the bottom mated flanges to be riveted in station No. 2. At the latter station, 26 bottom rivets are automatically delivered aligned with bottom holes in the side sills, through which they are advanced and swaged by the riveting devices. An overhead mono-rail 309 passes over the end of the conveyor 308 where the chassis frame assemblies are attached to a pair of hangers 311 which move along the mono-rail 309. At each of the stations 2, 3, and 4 a rail section 312 is supported for movement on vertical trackways 313 controlled by a fluid ram 314. The two hangers 311 supporting a frame 310 are advanced to station 2, 3, or 4 at each of which, through the actuation of the piston in the ram 314, the track section 312 is lowered, as illustrated in Fig. 51, to lower the chassis frame assembly into the devices of the station where the rivets thereof are swaged through the actuation of the device as referred to hereinabove. Thereafter, fluid is reversed in the ram 314 to raise the rail section 312, the hangers 311, and the chassis frame 310 out of the devices of the station in a position to be advanced along the mono-rail 309 to additional stations. After a frame has passed through all of the stations it is disconnected from the hangers 311 and deposited upon a conveyor table 315. From here the completed chassis frames are advanced through a painting booth from which they are moved to a shipping platform.

As pointed out hereinabove, the fluid employed for operating the devices is provided in two stages of pressure, one at approximately 1000 lbs. per square inch, and another at approximately 5000 lbs. per square inch. The fluid at low pressure is employed for moving the clamps, slides and the riveting dies to and from a desired position, while the fluid at high pressure is employed to operate the riveting devices to produce the swaging of the rivets. In Figs. 52 and 53 we have illustrated a system for producing and maintaining the two stages of pressures. A reservoir 318 has a return line 319 connected thereto while a plurality of pumps 321 operated by motors 322 supply fluid to an accumulator 324 where a low pressure is built up against a supply of air in a manner hereinafter referred to. Similarly, a pair of pumps 325 operated by motor 326 supply fluid to the accumulator 327 which is pumped against a head of air so that a high pressure may be built on the fluid delivered thereto. Air tanks 328 are supplied with a pressure of air from a compressor 329 operated by a motor 331, in response to a drop in pressure in the tanks. The air from the tanks 328 is supplied to the accumulators as required.

In Fig. 53, we have illustrated an accumulator 324 as embodying a casing 332 having a piston 333 movable therein. The piston has a cylindrical extension 334 projecting over a piston 335 having a passageway 336 therein. Air is introduced into the cylinder 332 through a conduit 337 while the fluid is conducted through a conduit 338 into the passageway 336 in the piston 335. A drain line 339 is provided so that the accumulator may be lowered to a predetermined position when desired. As a fluid, such as oil, is supplied by the pump 321 through the conduit 338 and passageway 336, it accumulates within the hollow cylindrical extension 334 of the piston 333 raising the piston within the cylinder to thereby compress the air trapped thereabove. In this manner the unit pressure on the fluid may be raised to the desired 1000 lbs. per square inch. In a similar manner the fluid pressure may be raised to approximately 5000 lbs. in the accumulator 327.

The cylindrical element 334 has secured thereto an arm 341 on which slides 342 having cams 343, 344, and 345 thereon are supported. A plurality of switches 346, 347 and 348 are disposed in the path of the cams 343, 344, and 345 respectively to be operated thereby as the cylindrical element 334 moves upwardly and downwardly conforming to the accumulation or deletion of the supply of fluid in the accumulator. It will be noted that the cams are disposed in offset relation so that one, two, or all three of the motors 322 will be operated, depending upon the position of the piston 334. A fluid line 340 is provided on the top of the air chamber 332 to admit fluid, such as oil, thereinto to provide several inches of oil on the piston 333 which effectively seals the piston against the escape of air from the chamber.

The flow of fluid from the low pressure accumulator is employed for operating the slides, the clamps, rivet approach, and the return thereof, while the high pressure supply of fluid from the adjacent accumulator is superimposed in the fluid conduit of the riveting devices to further operate the pistons and riveting heads thereof to perform the swaging operations. This control of the fluid is illustrated in Figs. 54, 55, and 57. The conduit 338 admits fluid from the low pressure accumulator 324 through a hand operated gate valve at each of the stations through a conduit 380 to a pilot operated emergency valve 381.

The high pressure fluid is conducted from the accumulator 327 from the supply conduit similar to the conduit 338 of Fig. 53; it being understood that the accumulator illustrated in Fig. 53 can be either the high or low pressure accumulator. The fluid then passes through a conduit 382, the hand operated gate valve 383 provided at each station, and through a conduit 384 to the pilot operated high pressure emergency valve 385.

The low pressure fluid, passing through the normally open emergency valve 381, passes through conduits 386 and 387 to the pilot operated four-way valves 388 and 389, respectively. The valve 389 being open, admits fluid to a manifold 391 actuating the pistons 392 for operating the clamps at the station. As soon as the pressure builds up in the manifold 391, a pressure switch 393 operates, through the relay control panel, the solenoids 394 which operates valve 388 to admit low pressure fluid to the manifold 395 to advance the pistons 396. The pistons advance the slides to move the riveting devices into a position where they may perform the riveting operation. Thereafter, pressure will build up in the manifold 395 and actuate the pressure switch 397.

The flow of fluid in the conduit 386 also passes through the conduit 398, through a check valve 399, and into a pilot operated four-way valve 401 employed to actuate the piston of the riveting device under low pressure to advance the riveting head to engage a rivet and thereafter to affect the swaging operation under high pressure. The solenoid operated pilot valve 402 bleeds fluid from the large end of the differential piston 403 of the four-way valve 401. This permits the pressure passing into the orifice 404 from the check valve 399 to impinge upon the head 405 of the piston 403 to raise the piston and admit fluid to the manifold 407 as illustrated in Fig. 55. When the pressure builds up in the pilot line 408, the piston 409 of the balanced high pressure valve 411 is operated.

The high pressure fluid from the conduit 384 passing through the high pressure emergency valve 385 is admitted through a conduit 412 to the top of the valve 413 of the high pressure admission valve 411 to apply a predetermined load to the top thereof. Similarly the piston 409 has been so dimensioned as to have the low pressure fluid admitted through the pilot line 408 produce a balance of pressures at both sides of the pistons 413.

It was found that it is often desirable to reduce the ratio of the pressure in the high pressure line to that of the low pressure in the low pressure line, and when this occurs it was found that the pressure on the low pressure line would operate the piston 409 while the pressure was being employed to operate the pistons of the clamps or during the approach cycle of the riveting devices. To provide adjustment to overcome such unbalanced condition we have provided a spring 414 having one end impinging upon a collar 415 which contacts the valve 413, the other end of which abuts against a plate 416, the position of which is adjustable by a screw 417 which loads the spring a predetermined amount to retain the balanced condition in the valve between the pressures in the high and low pressure lines.

When the valve 413 is open through the admission of fluid from the pilot line 408, the high pressure fluid from the conduit 412 passes through the valve 411 and the conduit 418 to the check valve 399, the valve 419 of which is moved downwardly against the flow of low pressure fluid from the conduit 398. This admits the flow of fluid under high pressure into the orifice 404 of the four-way valve 401 to the manifold 407. At the introduction of low pressure fluid, as described above in regard to manifold 407, the fluid is conducted to the pistons 421 which advances the pistons and brings the riveting heads forward into engagement with the rivet to be swaged. Thereafter, upon the operation of the balanced pressure valve 411 the high pressure fluid is introduced into the manifold 407 to further advance the pistons 421 and therefore the riveting heads under high pressure to thereby perform the swaging operation on the rivets.

As pressure builds up in the manifold 407 after the swaging operation, a pressure switch 422 is operated. Through the actuation of the pressure switch 422 the four-way valve 402 is operated to open the circuit to the top of the piston 403 to thereby force the valve downwardly against the high pressure flow of fluid in the orifice 404. The area of the piston 403 being materially greater than the head 405, a greater resulting pressure occurs on the top of the piston 403 to urge the piston downwardly to close the orifice 404. The closing of the piston 403 cut off the flow of fluid to the pilot line 408 which therafter is connected to the return line. Consequently, the pressure on the top of the valve 413 moves the valve and head 415 downwardly to close the valve and cut off the flow of fluid under high pressure. The shifting of the four-way valve 402 cuts off the pressure on the top of the differential piston 423 which permits the low pressure in the conduit 424 to impinge upon the head 425 of the differential valve to raise the valve and admit fluid to the manifold 427 as illustrated in Fig. 55.

Fluid from the manifold 427 passes through a check valve 428 into the manifold 429 which introduces pressure on the rod end of the cylinders containing the pistons 421 which forces the fluid on the lower end of the piston 421 back into the manifold 407 and the four-way valve 401 into the return line 431 through the check valve 432 which prevents any pressure in the return line from actuating any of the devices at any one of the stages. Such a pressure may develop through shock from other stations, or from high location of the return system. An additional spring-loaded check valve 433 is connected to the manifolds 427 and 429 for the return of the fluid at the rod end to the return line which closes at a predetermined pressure to maintain a desired pressure in the manifold 429 to prevent the rods from advancing between cycles.

When the pressure builds up in the manifold 429, the pressure switch 434 is operated which operates the solenoid 435 to shift the four-way valve 388 to introduce fluid into the manifold 436 and therefore to the rod ends of the cylinders containing the pistons 396 to return the pistons to their initial position as illustrated. This forces the fluid from the lower end of the piston out through the manifold 395 and valve 388 to the return line 437 containing a check valve 438.

As pressure builds up in the manifold 436, a pressure switch 439 is operated which operates a solenoid 441 to shift the four-way valve 389 which introduces fluid into the manifold 442. This introduces fluid into the rod ends of the cylinders containing the pistons 392 to return the pistons to their initial position, forcing the fluid on the lower side thereof out through the manifold 391 and the four-way valve 389 into the exhaust line 443 containing a check valve 444. The exhaust line 443 is connected to the exhaust line 440 which returns the oil to a reservoir. When the pressure builds up in the manifold 442 a pressure switch 445 is operated which again sets up the electrical system for the next cycle of operation.

Referring to Figs. 56, 58, and 59, we have shown the control circuits, embodying the pilot lines, the pressure switches, the relays, and the various control switches on a control panel located at each station and by which the complete control of the cycle may be had either automatically or manually.

In Fig. 58 we have illustrated the control panel 446 having a run button switch 447 by which the operator may set up the system to be operated automatically, or manually when operating a number of additional switches. When operating under the automatic cycle, the run button switch 447 is closed to complete a circuit to the relay 448, illustrated on the relay panel 449 of Fig. 6. A selector switch 451 is then turned from hand position to automatic position. This will energize the relay 452 of the panel 449 and the machine is now ready for automatic operation. The operator then presses the button of the clamp switch 453 of the panel 446 to start the automatic cycle. Under normal conditions, the relay 454 is closed so that the circuit is now completed to the relay 455. When the relay 455 closes, the circuit is completed to the solenoid 456 which operates the four-way valve 389 as described hereinabove, admitting fluid pressure to the manifold 391.

When pressure builds up in the manifold, the relay 393, illustrated on panel 457 of Fig. 59, is operated, completing the circuit to the relay 458, illustrated in Fig. 56. This energizes the solenoid 394 of Fig. 54 and operates the four-way valve 388 to admit fluid to the manifold 395. After the pressure builds up in manifold 395 the pressure switch is operated to complete the circuit to relay 459 which energizes the solenoid 461 of the four-way valve 402 as illustrated in Fig. 57. This introduces fluid to the manifold 407 for operating the approach cycle of the riveting devices.

When the pressure builds up in the manifold 407, as described above, the high pressure admission valve 411 is actuated to introduce high pressure fluid into the manifold 407 to complete the riveting cycle. Thereafter, pressure builds up in the manifold 407 operating the pressure switch 422, completing the circuit to the latch-type relay 462, illustrated in Fig. 56. This immediately shifts the relay 462, de-energizing the solenoids 456, 394, and 461 and completes a circuit to the relays 463 which in turn energizes the solenoid 464 of the four-way valve 402 illustrated in Fig. 57. This admits pressure to the manifolds 427 and 429 and returns the pistons 421 to the opposite end of the cylinders, as illustrated in Fig. 55.

When pressure builds up in the manifold 429 the pressure switch 434 is operated, completing the circuit to the relay 465 which in turn energizes the solenoid 435, admitting pressure to the manifold 436 and connecting the manifold 395 to the return line. This returns the piston to its initial position as illustrated in Fig. 54. When pressure builds up in the manifold 436 the pressure switch 439 energizes the relay 466 which completes the circuit to the solenoid 441 which operates the valve 389 to introduce fluid under pressure into the relay 442. This returns the pistons 399 to initial position as shown. When pressure builds up in the manifold 442, the pressure operates the pressure switch 445 and completes the circuit to the relay 454 which immediately shifts over to open the contacts of the relay 462 de-energizing the relays 463, 465, and 466, and in turn de-energizing solenoids 464, 435, and 441. The control mechanism of the machine is now set up for a new cycle which can be initiated by pressing the clamp button 453.

Referring to the control panel 446, reference has already been made to the selector switch 451, run button switch 447 and to the clamp button switch 453. An emergency stop switch 468 is provided on the panel with an emergency return switch 469 disposed adjacent thereto. A second emergency stop switch 471 is mounted on the panel having adjacent thereto an emergency start switch 473. A switch 474 is mounted on the panel for operating a valve to admit fluid to the hydraulic ram and raise the chassis frame at a station while an adjacent switch 475 operates the valve to lower the chassis frame in the devices of the station.

When the selector switch 451 is turned to the hand operating position, the following additional switches are employed for producing, by hand selection, the operation of the various devices in the cycle as set forth above. After the switch has been turned to hand operation the button switch 453 is first closed to produce the operation of the pistons 392 for operating the clamping device of the station. A button switch 476 is then operated to produce the advance of the pistons 396 which advances the riveting device adjacent to the rivets to be swaged. A button switch 477 is then closed to produce the riveting cycle; that is to say, the advance of the pistons 421 illustrated in Fig. 55 to rivet approach and thereafter the swaging operations. A button switch 478 is then operated to retract the pistons 421 to starting position and thereafter a button switch 479 is closed to return the pistons 396 to starting position which returns the riveting device to initial positions as the button switch 481 is closed to return the piston 392 to starting position which releases the clamps from the chassis frame and sets up the relays for another cycle of operation.

It is to be understood that when pressing each button of the switches, the operation of the valves, pressure switches, and relays occurs for that particular portion of the cylcle controlled by that particular switch as set out hereinabove for automatic operation. It is to be understood that the relay 452 is shifted, as pointed out hereinabove, through the actuation of the selector switch 451.

A switch 482 is provided on control panel 449 through which the current to the relays pass and at which point such circuit may be interrupted. An emergency control switch 483 is provided at the top of the panel for connecting and disconnecting a circuit to the emergency switches 471 and 473 which in turn control the flow of current to solenoids 485 and 484, illustrated in Fig. 57, which completely cut off the flow of both high and low pressure fluid from the devices of the station. When the emergency stop switch 471 is actuated, a circuit is closed to the solenoids 484 and 485 to operate the associated valves which remove the pressure from the pilot lines to the pistons of the emergency control valves 381 and 385 which are moved immediately to closed position to cut off the supply of low pressure fluid from the conduit 380 and the high pressure fluid from the conduit 384 to the devices of the station which are immediately stopped. When the switch 473 is operated, the circuits to the solenoids 484 and 485 are interrupted, and the pilot valves again introduce fluid on the pistons of the emergency control valves which operate to open the fluid line therethrough to again admit the fluid to the devices.

Referring to Fig. 59, we have illustrated the pilot lines as being connected through check valves 486 and manifold 487 which communicates with a pressure indicating device 488. A return line 489 bleeds the pressure from the manifold 487 and fluid is thereby prevented from passing through the check valve back through another of the lines. Each line contains a gate valve 491 through which fluid is introduced to the manifold 487 so that the pressure of each line may be checked. The right hand pilot line 492 is that connected to the high pressure circuit, which line is connected directly to an indicator 493 by which the pressure may be checked when a valve 494 is open.

The check valves 486 are similar to those described and claimed in the co-pending application of H. G. Schultz, Serial No. 239,521, filed November 8, 1938, and assigned to the assignee of the present invention. This same check valve is employed at each end of the cylinder to control the speed of operation of the piston through the bleeding of the discharged fluid therethrough and which thereby prevents the too rapid operation of the piston and the hammering of the piston on the head or ends of the cylinder which would thereby damage the cylinder, the piping and operating mechanism associated therewith. The disposition of such valves in the fluid circuit of a cylinder is illustrated in Fig. 48.

While the button switch 471 will interrupt the flow of fluid through the circuits of the device, this switch is used as an emergency measure and switches 468 and 469 are used when it is desired to stop the operation at any point in a cycle. If, for any reason the operator intends to interrupt the cycle, he may do so by opening the switch 468 to de-energize the relays 459 and 452, which de-energizes all the relays, and consequently all the solenoids, preventing the machine from continuing its cycle.

At this point, one of four things may be done. First, the devices may be returned automatically to their initial position by pressing button switches 447 and 469. The devices of the machine will now return to their initial position in the reverse sequence of their forward movements. Second, continuing the cycle automatically. This is accomplished by pressing the button of switch 447 and that of the clamping switch 453. Third, returning the devices manually to their initial position. This is accomplished by returning the selector switch 451 to hand control, pressing the run button of switch 447, then pressing the buttons of switches 478, 479, and 481 in sequence or pressing button 481. This will have the devices of the machine go through their complete return cycle. Fourth, continuing the cycle manually. This is accomplished by turning the selector switch 451 to hand operation and pressing the button of the switch 447 and then starting the cycle as described under manual control, pressing the buttons of switches 453, 476, 477, 478, 479, and 481 in sequence.

In Figs. 60 and 61 we have illustrated, diagrammatically, the set up of relays and switches which control the operations automatically and manually. The automatic operation as outlined above, can readily be traced through the relays and pressure switches illustrated diagrammatically in Fig. 60. In automatic or manual control the clamps are first actuated, thereafter the slides are advanced to position the riveting devices which are actuated thereafter to swage the rivets. Thereafter the riveting heads are retracted, the slides return the riveting devices to their original position, and the clamps are thereafter released.

In Fig. 61, additional switches 476, 477, 478, 479, and 481 are illustrated, connected in the sequence of relays and pressure switches. Upon the energization of the switch 453 the clamps engage the frame, thereafter the switch 476 is closed to produce the advancement of the riveting devices to a position aligned with the rivets. Thereafter switch 477 is closed to produce the operation of the devices and the swaging of the rivets. Switch 478 is next closed to cause the riveting heads to return to retracted position. Thereafter, the closing of the switch 479 produces the return of the riveting devices to their original positions, after which the closing of switch 481 produces the unclamping of the frame.

As illustrated in Figs. 56 and 61, an additional relay 480 may be employed, shunting switches 478 and 479. The return cycle is performed automatically through the actuation of the switch 481 which produces the automatic return of the rivet heads and slides and the release of the clamps. When the switch 481 is closed the relay 480 is energized as well as the relay 466. Relays 463 and 465 are likewise energized and the operation of the pressure switches 434, 439, and 445 will thereafter occur in sequence the same as for the automatic cycle. At any time during the operation under the manual cycle the operator may continue the cycle automatically by turning the switch 451 from "hand" to "automatic" control.

It will thus be seen that we have devised a unique riveting method for machines under the complete control of the operator at all points in their cycle of movement. The riveting devices are constructed to swage rivets in a chassis frame of box section construction. While we have illustrated the various devices in the different stations as being useful for operating on box section structures of chassis frames, it is to be understood that other types of box section structures may be riveted by the devices assembled as illustrated or forming stations through the proper selection and location of the same or different devices. We, therefore, desire not to be limited to the riveting of chassis frames only, nor to the exact location of the clamps, the positioning devices, the rivet delivering elements, the type and location of the riveting devices themselves, since it is within the purview of one skilled in the art to provide different arrangements than those shown for the purpose of illustration. Broadly, our inventive concept embodies the riveting of box section structures by the devices illustrated or modified by one skilled in the art. Such devices are selected and positioned to the best advantage when considering the type of box section workpiece to be assembled and riveted together. The control of such devices follows substantially that above described wherein the piece is first positioned in the device and clamped relative thereto. The rivets are delivered adjacent to the aperture in the workpiece and the riveting devices are advanced into position in alignment with the rivets which are swaged thereafter. The return of the various elements to their initial position follows the sequence set forth above, wherein the riveting heads are retracted, the riveting devices moved away from the structure, and the clamps thereafter released.

While we have described and illustrated but a single embodiment of our invention, it will be apparent to those skilled in the art, that various changes, additions, omissions, and substitutions may be made therein without departing from the spirit and scope of our invention, as set forth in the appended claims.

What we claim is:

1. Mechanism for riveting box section structures embodying telescoped channel elements oppositely presenting, including, in combination, clamping means for said structure, positioning means for spacing the elements relative to each other, a riveting device having relatively movable aligned riveting heads, supports for said riveting device which moves the device to have a head thereof inserted through an aperture in said structure in alignment with a rivet, and a control system connected therewith and operated thereby to produce sequential operation of said positioning means, riveting devices and the supports therefor.

2. Mechanism for riveting box section structures embodying telescoped channel elements oppositely presenting, including, in combination, clamping means for said structure, positioning means for spacing the elements relative to each other, riveting means having relatively movable aligned riveting heads, supporting means for said riveting device which moves the device to have a head thereof inserted through an aperture in said structure in alignment with a rivet, a control system interconnected to said means and operated by the movement of said means to move said means in sequence, means interconnected in said system for thereafter relatively moving said heads into engagement with the rivets, and means also interconnected in said system for further relatively moving said heads for swaging said rivets.

3. Mechanism for riveting box section structures embodying telescoped channel elements oppositely presenting, including, in combination, clamping means for said structure, positioning means for spacing the elements relative to each other, riveting means having relatively movable aligned riveting heads, supporting means for said riveting device which moves the device to have a head thereof inserted through an aperture in said structure in alignment with a rivet, a control system interconnected to said means and operated by the movement of said means to move said means in sequence, means interconnected in said system for thereafter relatively moving said heads into engagement with the rivets, and means also interconnected in said system for further relatively moving said heads for swaging said rivets, said means for operating said heads embodying a fluid having two stages of pressure.

4. Mechanism for riveting box section structures having overlapped flanges with apertures in the structure adjacent to rivets to be swaged, including, in combination, riveting means having riveting heads, means for advancing said riveting means to move one head through an opening into alignment with a rivet, means for relatively moving said heads thereafter to engage said rivet means for further moving said heads to swage the rivets, and a control system interconnected to said means for producing said movement in sequence.

5. Mechanism for riveting box section structures having overlapped flanges with apertures in the structure adjacent to rivets to be swaged, including, in combination, riveting means having riveting heads, means for advancing said riveting means to move one head through an opening into alignment with a rivet, means for relatively moving said heads thereafter to swage said rivet, said moving means embodying a low-pressure stage of fluid for first moving the heads into engagement with the rivets, a high-pressure stage of fluid for further relatively moving said heads to swage said rivets and a control system interconnected to said means and stages of fluid pressure for producing said movements in sequence.

6. Mechanism for riveting box section structures having overlapped flanges and apertures in the structure adjacent to rivets to be swaged, including, in combination, clamps for positioning the structure, riveting devices adjacent to said rivets, having riveting heads, means for advancing said devices to move one head through an aperture into alignment with said rivets, means for relatively moving said heads toward each other to engage and swage said rivets, and a control system interconnected to said clamps, devices, advancing means and relatively movable means, and actuated by the operation thereof to produce sequential operation of the clamps, devices and means on said structures.

7. Mechanism for riveting box section structures having overlapped flanges and apertures in the structure adjacent to rivets to be swaged including, in combination, clamps for positioning the structure, positioning devices for aligning the rivet receiving holes in the flanges, rivet sticking devices adjacent to said holes for delivering rivets thereto and a control system interconnected thereto and operated thereby for producing sequential operation of said clamps and devices.

8. Mechanism for riveting box section structures having overlapped flanges and apertures in said structures adjacent to the rivets to be swaged including, in combination clamps for positioning the structure, positioning devices for aligning the rivet receiving holes of the flanges, rivets for said holes, riveting devices, and control means interconnected thereto and operated thereby for operating in sequence the clamps, the positioning devices, and the riveting devices which are first moved to have portions extend through said apertures into alignment with the rivets, then moved into engagement with the rivets and thereafter moved to swage the rivets, said control means continuing the cycle of operation by retracting the riveting devices, the positioning devices and releasing the clamps, each being controlled by the prior actuation of a clamp or a device.

9. Mechanism for riveting box section structures having overlapped flanges and apertures in the structure adjacent to rivets to be swaged including, in combination, clamps for positioning the structure, positioning devices for aligning the rivet receiving holes in the flanges, rivet sticking devices, riveting devices, and a control system interconnected thereto and operated thereby for operating in sequence the clamps, the positioning devices, the rivet stickers, and for advancing the riveting devices to have portions extend through said apertures into alignment with the rivets, to operate the devices to engage the rivets and thereafter to swage the rivets.

10. Mechanism for riveting box section structures having overlapped flanges and apertures in the structure adjacent to rivets to be swaged including, in combination, clamps for positioning the structure, positioning devices for aligning the rivet receiving holes in the flanges, rivet sticking devices, riveting devices, and a control system interconnected thereto and operated thereby for operating in sequence the clamps, the positioning devices, the rivet stickers, and for advancing the riveting devices to have portions extend through said apertures into alignment with the rivets, to operate the devices to engage the rivets and thereafter to swage the rivets, and continuing the operating cycle by retracting the riveting devices, the rivet stickers, the positioning devices, and releasing the clamps each subsequent operation being dependent upon the prior operation of the sequence.

11. The combination in a device for riveting box section structures having apertures adjacent to the rivet receiving holes, of means positioning the walls of the structure to have the rivet holes aligned, means for advancing a rivet into alignment with the holes, riveting means having riveting heads means for advancing the heads of the riveting means into alignment with the rivet through the extension of one of said heads through said aperture, means for relatively moving the heads toward each other for inserting the rivet through the holes and for engaging both ends of the rivet, means for thereafter further moving the head for swaging the rivet, and a control system interconnected to said means and actuated by the movement thereof to produce sequential operation of said means.

12. In a riveting device having a plurality of clamps, slides, and riveting devices, in combination with a fluid accumulator embodying a pump for accumulating fluid under a low stage of pressure, a pump for accumulating fluid under a high stage of pressure, and circuit and valve means for operating under low fluid pressure the clamps, the slides, and the riveting devices into engagement with the rivets, and for thereafter operating the riveting devices under high pressure to produce the swaging operation.

13. In a device for riveting assembled elements embodying clamps, riveting device slides and riveting devices, including, in combination, a low pressure fluid accumulator, a high pressure fluid accumulator, a pump for supplying an accumulation of fluid under low pressure, a pump for supplying an accumulation of fluid under high pressure, a fluid system interconnecting the fluid of the accumulators to the various devices, and valve means in said system for supplying fluid to operate the clamp, slides, and riveting devices in sequence under low pressure and for operating the riveting devices thereafter under high pressure.

14. In a device for riveting assembled elements embodying clamps, riveting device slides and riveting devices, including, in combination, a low pressure fluid accumulator, a high pressure fluid accumulator, a pump for supplying an accumulation of fluid under low pressure a pump for supplying an accumulation of fluid under high pressure, a fluid system interconnecting the fluid of the accumulators to the various devices, valve means in said system for supplying fluid to operate the clamp, slides, and riveting devices in sequence under low pressure and for operating the riveting devices thereafter under high pressure, and an electric control system inter-related with said valve for producing the operation of said clamps, slides and riveting devices in a predetermined sequence to operative and inoperative position.

15. In a device for riveting assembled elements embodying clamps, riveting device slides and riveting devices, including, in combination, a low pressure fluid accumulator, a high pressure fluid accumulator, a pump for supplying an accumulation of fluid under low pressure, a pump for supplying an accumulation of fluid under high pressure, a fluid system interconnecting the fluid of the accumulators to the various devices, valve means in said system for supplying fluid to operate the clamp, slides, and riveting devices in sequence under low pressure and for operating the riveting devices thereafter under high pressure, an electric control system inter-related with said valve for producing the operation of said clamps, slides, and riveting devices in a predetermined sequence to operative and inoperative position, and means whereby the clamps, slides and devices may be operated selectively.

16. In a device for riveting assembled elements embodying clamps, positioning elements, rivet stickers, riveting device slides, and riveting devices, including, in combination, a low pressure fluid accumulator, a high pressure fluid accumulator, a pump for supplying fluid to said high pressure accumulator, a fluid system interconnecting the fluid of the accumulators to the various devices, and means on said accumulators for automatically operating said pumps as additional supply of fluid is required.

HARRY G. SCHOLTZ.
OTTO MUELLER.

CERTIFICATE OF CORRECTION.

Patent No. 2,355,997. August 15, 1944.

OTTO MUELLER, ET AL.

It is hereby certified that error appears in the printed specification of the above numbered patent requiring correction as follows: Page 7, second column, line 69, for "silde" read --slide--; page 12, first column, line 27, for the word "cut" read --cuts--; line 28, for "therafter" read --thereafter--; page 16, second column, line 12, claim 16, after the syllable and comma "lator," insert --a pump for supplying fluid to said low pressure accumulator,--; and that the said Letters Patent should be read with this correction therein that the same may conform to the record of the case in the Patent Office.

Signed and sealed this 28th day of November, A. D. 1944.

Leslie Frazer (Seal)                  Acting Commissioner of Patents.